United States Patent
Noguchi et al.

(12)

(10) Patent No.: US 6,790,875 B2
(45) Date of Patent: Sep. 14, 2004

(54) PHOTOCURABLE AQUEOUS RESIN COMPOSITION, INK, RECORDING UNIT, INK CARTRIDGE, INK-JET RECORDING APPARATUS AND PHOTOPOLYMERIZATION INITIATOR

(75) Inventors: Hiromichi Noguchi, Tokyo (JP); Yuko Suga, Tokyo (JP); Hiroyuki Maeda, Kanagawa (JP); Masako Shimomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 09/951,460

(22) Filed: Sep. 14, 2001

(65) Prior Publication Data

US 2002/0065335 A1 May 30, 2002

(30) Foreign Application Priority Data

Sep. 14, 2000 (JP) ........................................ 2000/280761
Sep. 13, 2001 (JP) ........................................ 2001/278526

(51) Int. Cl.$^7$ .............................. C08F 2/46; C08F 2/50; C08J 3/03; C08J 3/28; G03C 5/00
(52) U.S. Cl. ............................. 522/84; 522/53; 522/85; 522/71; 522/74; 522/86; 522/178; 522/182; 522/181; 523/160; 547/1; 106/31.13
(58) Field of Search ............................. 522/53, 84, 85, 522/71, 74, 86, 178, 182, 181; 523/160; 106/31.13; 347/1

(56) References Cited

U.S. PATENT DOCUMENTS

| | | | |
|---|---|---|---|
| 4,348,530 A | 9/1982 | Kvita et al. ................... 549/27 |
| 4,385,182 A | 5/1983 | Fischer et al. ................. 549/27 |
| 4,418,138 A | 11/1983 | Curtis ........................ 430/253 |
| 4,459,416 A | 7/1984 | Curtis et al. .................. 549/27 |
| 4,507,497 A | 3/1985 | Reilly, Jr. .................... 562/441 |
| 4,602,097 A | 7/1986 | Curtis ........................ 549/27 |
| 4,978,969 A | 12/1990 | Chieng ...................... 346/1.1 |
| 5,281,261 A * | 1/1994 | Lin ......................... 106/31.65 |
| 5,612,388 A | 3/1997 | Irizawa et al. ................. 522/6 |
| 5,658,376 A | 8/1997 | Noguchi et al. ........... 106/31.43 |
| 5,681,643 A | 10/1997 | Noguchi et al. ............. 428/195 |
| 5,696,182 A | 12/1997 | Kashiwazaki et al. ...... 523/161 |
| 5,736,298 A * | 4/1998 | Koshimura et al. ....... 430/287.1 |
| 5,837,045 A | 11/1998 | Johnson et al. ........... 106/31.85 |
| 5,851,280 A | 12/1998 | Belmont et al. ............. 106/472 |
| 5,866,638 A | 2/1999 | Shimomura et al. .......... 523/16 |
| 5,952,401 A | 9/1999 | Kimura et al. .............. 523/161 |
| 6,040,358 A * | 3/2000 | Page et al. .................. 523/161 |
| 6,176,908 B1 * | 1/2001 | Bauer et al. .............. 106/31.15 |

FOREIGN PATENT DOCUMENTS

| | | |
|---|---|---|
| EP | 0 953 613 A2 | 11/1999 |
| JP | 62-64874 A | 3/1987 |
| JP | 4-117469 | 4/1992 |
| JP | 5-186725 | 7/1993 |
| JP | 5-247392 A | 9/1993 |
| JP | 7-40649 | 2/1995 |
| JP | 8-143802 A | 6/1996 |
| JP | 8-165441 A | 6/1996 |
| JP | 8-209048 A | 8/1996 |
| JP | 9-31360 A | 2/1997 |
| JP | 9-104834 | 4/1997 |
| JP | 9-151342 | 6/1997 |
| JP | 9-316353 | 12/1997 |
| JP | 10-140065 | 5/1998 |
| JP | 2000-117960 A | 4/2000 |
| JP | 2000-186243 | 7/2000 |
| WO | WO 99/10409 | 3/1999 |
| WO | WO 00/09332 | 2/2000 |

* cited by examiner

Primary Examiner—James J. Seidleck
Assistant Examiner—Sanza L. McClendon
(74) Attorney, Agent, or Firm—Fitzpatrick, Cella, Harper & Scinto

(57) ABSTRACT

An useful aqueous photocurable resin composition is provided. The aqueous photocurable resin composition of the present invention comprises at least water, a polymerizable material polymerizable with radical initiation and a water-soluble photopolymerization initiator which generates a radical with light, wherein the polymerizable material has at least two polymerizable functional groups and one anionic functional group.

13 Claims, 5 Drawing Sheets

PHOTOCURABLE AQUEOUS RESIN COMPOSITION, INK, RECORDING UNIT, INK CARTRIDGE, INK-JET RECORDING APPARATUS AND PHOTOPOLYMERIZATION INITIATOR

BACKGROUND OF THE INVENTION

1. Field of the Invention

The present invention relates to an aqueous photocurable resin composition containing a novel aqueous polymerizable compound, an ink, an ink-jet recording method using the ink, an ink cartridge, a recording unit and an ink-jet recording apparatus. In the field of resinous painting technology, conversion to aqueous paints or inks which do not use organic solvents in a large quantity and are much more ecology-minded is one of the important problems.

The present invention is directed to a useful resin composition which meets such a demand. The resin composition of the present invention can be used as a material for a UV curable aqueous ink for use by an ink-jet apparatus. The present invention also provides an anionic polymerization initiator which has a high water solubility.

2. Related Background Art

As one of the techniques related to screen inks, gravure inks, or aqueous paints, there is a process for forming an image in which a resin in an ink or paint is cured by ultraviolet light irradiation, and the ink or paint is often an aqueous ink or paint. Such an aqueous paint or ink, however, contains a non-aqueous UV curable resin composition emulsified in an aqueous solvent. Thus, the UV curable resin composition used in aqueous paint or ink in the prior art is not itself an aqueous system and it is not going too much to say that aqueous UV curable resins and catalysts have not been pursued.

Use of a UV curable ink is also known in the ink-jet printing process. In this field, also, the resin composition used is a non-aqueous system, for example, an oil-ink in which a pigment is dispersed in an organic solvent such as toluene, methylethyl ketone, etc. For marking, an ink comprising resin monomer and oligomer and a pigment dispersion not using solvent is used. Japanese Patent Publication 5-64667 discloses a typical example of such an ink. However, since the ink viscosity of these inks is too high to print precise letters, their use is limited to dot printing such as marking which does not require high precision.

Inks employed in the aforementioned systems do not possess ink properties required for full color printing with high-resolution. For example, the oil-ink should be used with care from the environmental point of view, and the solvent-free UV-curable ink is usable only for a low-resolution printer of large dot size. U.S. Pat. No. 4,978,969 discloses an ink for ink-jet recording wherein a certain kind of a polymerizable monomer is used in a large amount as a solvent to dissolve the UV-curable adhesive. Although application to a thermal ink jet system is also intended in the above invention, actually, materials are limited and the monomer is used in a large amount, so that it is not all-purpose and not applicable for high quality image formation.

The reason why the use of UV curable ink remains in the conditions as described above in the art may be considered as follows:

1) Images formed with an ink or paint comprised of a resin dissolved in water do not have sufficient quality even after cure because of poor water-resistance and low gross; and 2) Aqueous UV curable resins or aqueous photopolymerization initiators having a catalytic function to assist curing of such a resin (hereinafter, referred to as "catalyst") have hardly been developed.

In addition, one may point out another reason for slow development in material technology of aqueous UV-curable inks:

3) When water is used as a paint solvent, relatively a large amount of energy is required for drying in comparison with an organic solvent, which is a drawback in practical use.

On the other hand, the above mentioned resin composition in an emulsion state generally has an advantage that viscosity and fluidity can be controlled to vary in a wide range, and handling is easy.

However, the UV curing technique is still regarded as a promising curing technique in view of energy saving, low environmental contamination, and low burden to the environment. Further, the UV-curing process is considered useful for not only image printing but also for pretreatment of a substrate to provide printing suitability, or for post-treatment of the printed substrate to protect it or to apply a certain material for further processing.

At present, aqueous materials such as the above mentioned aqueous UV curable resins and catalysts are hardly available for an ink-jet recording ink. Here, to be used in an ink-jet system, materials having a good fluidity and a low viscosity are required to cope with the high-density nozzles. For example, the following properties are required for resin materials such as catalysts and polymerizable materials: the polymerizable compound can be added to an ink at a high content; substantial drying process can be shortened, the cured layer formed by applying the ink followed by curing has excellent properties; and the resin material show a good compatibility with coloring materials.

The UV curable water-soluble materials practically in use include those having both of an acidic group and (meth) acryloyl or vinyl group in one molecule, and as a water-soluble polymerizable compound, an ester of anhydrous succinic acid and 2-hydroxyethyl(meth)acrylate, an ester of anhydrous ortho-phthalic acid and an ester of 2-hydroxyethyl(meth)acrylate, and vinylnaphthalene sulfonic acid are actually in use. However, these compounds have only one functional group per molecule, thus, the polymerization speed is slow and crosslinking degree is extremely small, so that they cannot be used as a main material for the UV-crable resin composition.

In the meantime, polymerizing compounds being water-soluble, having at least two polymerizable functional groups per molecule and being produced in an industrial scale include those having a polyethyleneoxide chain which provides hydrophilicity to the molecule. For example, it can be mentioned a (meth)acrylic acid ester of polyvalent alcohol such as diethyleneglycol di(meth)acrylate, tetraethyleneglycol di(meth)acrylate, etc. According to the present inventors' investigation, however, the aforementioned compounds lack water-solubility when the ethyleneoxide chain is short, and when the ethyleneoxide chain is long, the water solubility is sufficient but the solid properties such as hardness or adhesiveness of the polymerized or cured resin is not sufficient enough to satisfy the requirements for a paint or ink Japanese Patent Application Laid-Open No. 8-165441 discloses water-soluble polymerizable polyfunctional compounds. The compounds disclosed in this publication have got water-solubility due to the increased number of hydroxy groups in a molecule.

Japanese Patent Application Laid-Open No. 2000-117960 discloses practical use of (meth)acrylic acid ester of a hydrophilic polyepoxide derived from glycerin. However, according to the study of the present inventors, although these compounds are excellent in UV polymerization ability and in physical properties of cured product, they have a problem in that the viscosity of an aqueous solution is somewhat higher than that required for an ink-jet ink.

Although various compounds having a basic atomic group are industrially produced such as monofunctional tertiary amines and cationic acrylic monomers, at present, few compounds are present in an industrial level which are basic and polyfunctional. Concerning polyfunctional, water-soluble, polymerizing compounds, U.S. Pat. No. 5,612,388 and Japanese Patent Application Laid-Open Nos. 8-165441 and 2000-117960 propose synthesis of polyfunctional cationic acrylic monomers and application thereof. These cationic polyfunctional compounds however, have an opposite polarity to that of an aqueous pigment dispersion being suitable as a coloring material for inks and paints where a pigment is homogeneously dispersed in an aqueous medium by the action of dissociable cationic groups. Thus, they do not have a compatibility with the pigment dispersion and cannot be applied to a coloring composition such as paint or ink other than some specific use.

Properties desired for a UV curable resin composition material useful for ink-jet recording ink are: when it is contained in an ink, the ink has a good ejecting property from the ink-jet recording head, rapidly polymerizes under UV irradiation; and is highly crosslinked and has superior hardness and adhesiveness when cured. Thus, such a UV curable resin composition material is a water soluble compound having low viscosity and multiple functional groups.

On the other hand, compounds known in the prior art to have such properties do not ionize in an aqueous solution but their water-solubility is provided by introducing numerous hydroxyl groups. Japanese Patent Application Laid-Open No. 8-165441 discloses this kind of compounds. But, these compounds whose water-solubility is not due to ionization have problems that the molecular size is liable to be large, and even in the cross-linked solid state, hardness and adhesiveness are not still satisfactory. For a rapid polymerization rate, plural polymerizable functional groups are needed. However, in order for a compound to have multiple polymerizable functional groups, water-solubility and stability at the same time, the compound has to satisfy requirements not compatible with each other. This is the reason why such an ideal compound has not been found yet.

SUMMARY OF THE INVENTION

Therefore, it is an object of the present invention to provide a UV curable resin composition of high performance.

It is also an object of the present invention to provide a photopolymerizable aqueous ink which is able to form high-quality images.

Another object of the present invention is to provide an ink-jet recording apparatus for forming high-quality images, a recording unit and ink cartridge utilized therefor.

Yet another object of the present invention is to provide a photopolymerizable initiator of high water-solubility which can be adequately used in a photocurable aqueous resin composition.

According to an embodiment of the present invention, it is provided an aqueous photocurable resin composition comprising at least water, a polymerizable material which polymerizes with radial initiation and a water-soluble photopolymerization initiator which generates radicals with light, wherein the polymerizable material has at least two polymerizable functional groups and one or two anionic functional groups.

According to another embodiment of the present invention, there is provided an aqueous ink which comprises the above mentioned an aqueous photocurable resin composition as a main component.

According to still another embodiment of the present invention, there is provided an ink-jet ink which comprises the aforementioned aqueous photocurable resin compostion.

According to still another embodiment of the present invention, there is provided a recording unit comprising an ink container containing the above ink-jet ink, and a head portion from which the ink is ejected.

According to still another embodiment of the present invention, there is provided an ink-jet recording apparatus comprising an ink container containing the above ink-jet ink, and a head portion from which the ink is ejected.

According to still another embodiment of the present invention, there is provided a photopolymerization initiator comprising a compound represented by Formulae TX1, TX2 or TX3:

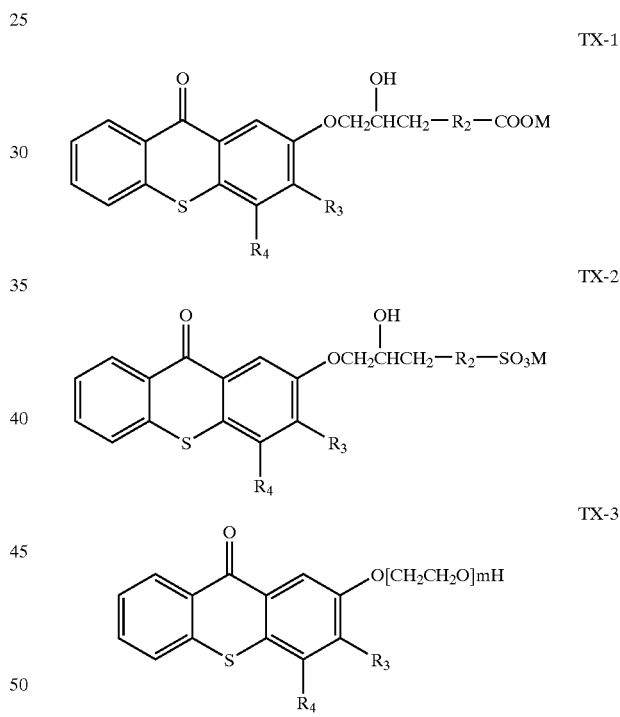

wherein, R2 is a group selected from the group consisting of —$(CH_2)_x$— (x=0 or 1), —O—$(CH_2)_y$— (y=1 or 2), and substituted or unsubstituted phenylene, M is a hydrogen atom or an alkaline metal, R3 and R4 independently represent a hydrogen atom or a group selected from the group consisting of substituted or unsubstituted alkyls, and m is an integer from 1 to 10.

DETAILED DESCRIPTION OF THE INVENTION

Figure 1:
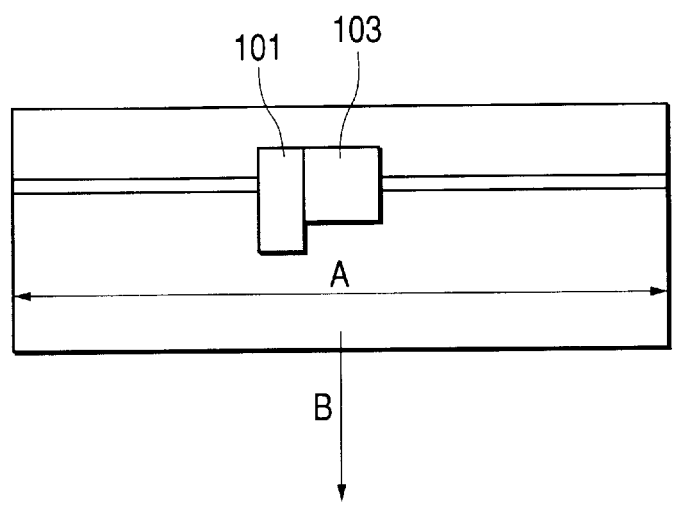
FIG. 1 illustrates a relative position of a recording head of an ink-jet printer and a UV lamp of the UV irradiation device.

Hereinafter, the present invention is described in detail with the preferred embodiments of the invention.

As a result of an intensive study to solve the above described problems in the prior art, the inventors of the present invention found that a compound that has at least two polymerizable functional groups and one or two, preferably one, anionic functional group and can perform radical polymerization by light such as UV light has the desired water solubility and is suitably used as a material for an ink jet recording ink, because such a compound is highly reactive and water soluble due to the dissociation group, although it does not have other hydrophilic groups and is small in size. The present invention is based on such findings.

According to the present invention, when an aqueous photocurable resin composition contains the aforementioned particular polymerizable compound, the composition has water-solubility, low viscosity and compatibility with various aqueous pigment dispersions where a pigment is dispersed by various techniques, and can achieve rapid polymerization even in the presence of a pigment, and rapidly curable by light such as UV light. Thus, an ink containing such a resin composition has good drying properties, and can form images of excellent quality having good adhesiveness to the substrate and water-resistance by printing (including ink-jet printing).

Next described is the action and effect of the photocurable aqueous resin composition of the present invention in an aqueous ink-jet printing which is a main application of the composition. In the following description, light is exemplified by UV ray which is particularly preferable, but the the light employable in the present invention for curing is not limited to UV light.

The main objects of using the UV curable resin composition of the present invention in the aqueous ink for the ink jet image recording system are as follows:

1) Increase of drying speed in order to cope with increasing printing speed;
2) Formation of images having excellent rub-off resistance on various recording media by using the resin composition as a binder for the coloring material to bond it to the recording medium;
3) Reduction of the light scattering from the pigment particles to enable formation of a transparent ink layer;
4) Consequently, expansion of the color reproduction scope of process colors, and inks having high concentration, as well as excellent chroma and brightness;
5) Additionally, protection of the coloring materials from active light, gaseous components and or water in the air.

Application of the UV curable resin composition of the present invention to an ink exerts remarkable effect on a recording material such as normal paper that has ink absorbency but has difficulty in enhancement of the color tone and rub-off resistance of a pigment image. Further, it enables printing on non-absorptive base material with an aqueous ink.

The UV curing method is considered as a kind of forced drying where the ink applied onto a recording material forming a free surface before completely absorbed by the recording material is, so to speak, frozen in that condition. As a result, the followings are achieved by the ink containing the UV curable aqueous resin composition as a main component:

1) Pigment particles in the ink are included in the solid ink layer in a dispersion state;
2) Resin portions distributing inside the recording medium and on the surface of the paper fix the pigment particles on such positions and attach them to the recording medium;
3) The respective pigment particles which separately exist in the above positions induce light scattering each other to make the deterioration in image concentration, chroma and shift in hue minimum.
4) The smooth surface formed by the resin provides a glossy ink layer with less light scattering.

With the ink containing the UV curable aqueous resin composition of the present invention as a main component, the penetration and evaporation of the solvent component such as water occur gradually from the solidified ink layer. Although the apparent fixation time, i.e., the necessary time for allowing transportation and piling up of the printed recording medium, is considered shortened because of apparent quick drying, the real drying is unavoidably slow as long as an aqueous solvent is used in comparison with an ink using an organic solvent. When the ink of the present invention is used, a forced finishing heat dryer may be employed according to the purpose.

How the UV curing, the radical polymerization, of a polymerizable material by UV irradiation proceeds in the presence of moisture as in the ink of the present invention is important in view of radical kinetics. According to the study of the present inventors, if no pigments exist in ink (colorless ink), no particular retardation of polymerization was observed in water in comparison with in a solvent-free system. Because the polymerized product includes water, their solid properties are, of course, different from those of the product in a solvent-free system.

Next described is the UV curable aqueous resin composition of the present invention having the aforementioned superior effect, and the ink composition containing it as a main component.

The UV curable aqueous resin composition of the present invention comprises at least water, a polymerizable material which performs radical polymerization by UV irradiation, and a water-soluble photo-polymerization initiator which generates radicals by UV irradiation, wherein the polymerizable material has at least two polymerizable functional groups and a single anionic functional group.

Polymerizable Material Which Performs Radical Polymerization With UV

First, the polymerizable materials used in the present invention which performs radical polymerization by UV irradiation are explained. Such polymerizable materials include hydrophilic multifunctional polymerizable compounds as shown below. These compounds are highly hydrophilic, water-soluble, polymerizable at a high polymerization rate. They also have a low viscosity and the viscosity of an aqueous solution thereof is much lower than the known compounds in the art.

Specifically, the polymerizable materials used in the present invention are exemplified by the water-soluble compounds of group A having a polyol residue as residue R, and of group B having an epoxyester of polyol as residue R in the following formula:

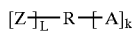

k: 2 or 3, L: 1 or 2
Z: COO⁻ or a salt thereof.

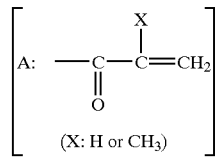

In the compounds of Group A, those exemplified below are preferably used. In the formulas A1 to A11, A, X, Rx, Ry, Rz, and Rp independently represent the following atomic groups.

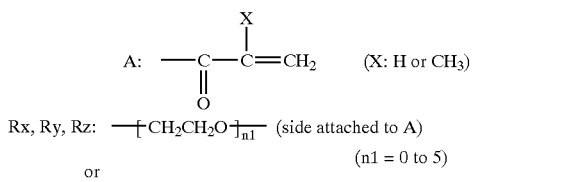

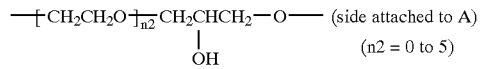

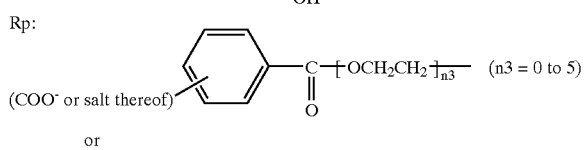

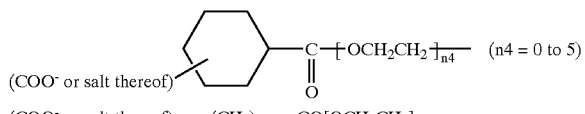

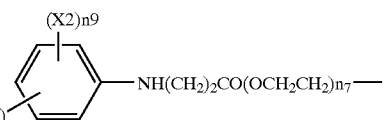

n7 = integer 0 to 5
n9 = integer 1 to 4
X2 = halogen atom, alkoxy group, nitro group where halogen of X2 represents fluorine, chlorine and bromine, and the alkoxy group has 1 to 3 carbon atoms.

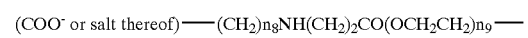

n8 = integer 1 to 6
n9 = integer 0 to 5

First, the following polymerizable compounds of formula A1 can be used. More particularly, compounds A1-1 and A1-2 as represented below can be used.

Polymerizable material Group A1

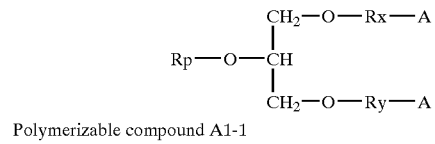

Polymerizable compound A1-1

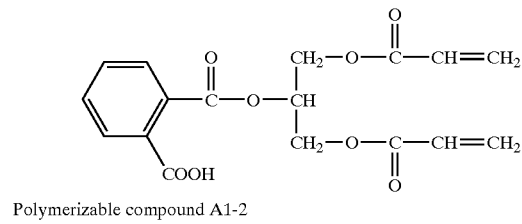

Polymerizable compound A1-2

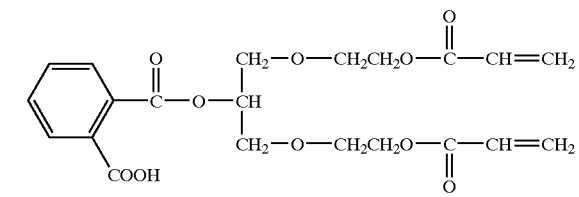

Also, the polymerizable compounds which belong to the following Group A2 can be used. More particularly, the polymerizable compounds A2-1 as represented below can be used.

Polymerizable material Group A2

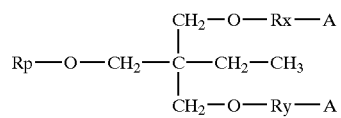

Polymerizable compound A2-1

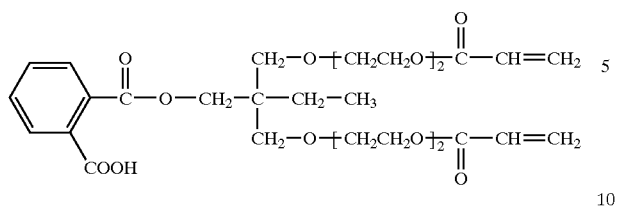 5

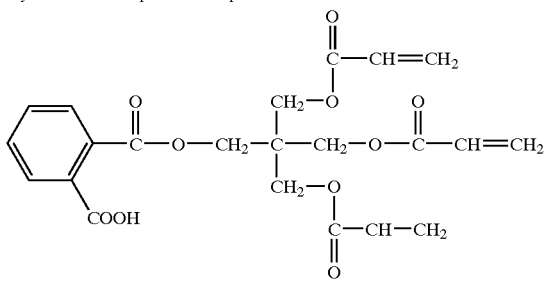 10

Further, the compounds of the following Group A3 can be used. More particularly, the polymerizable compounds A3-1 to A3-4 as represented below can be used.

Polymerizable material Group A3

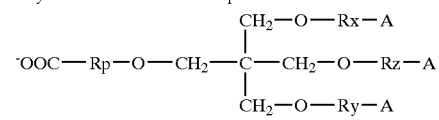

Polymerizable compound Group A3-1

Polymerizable compound Group A3-2

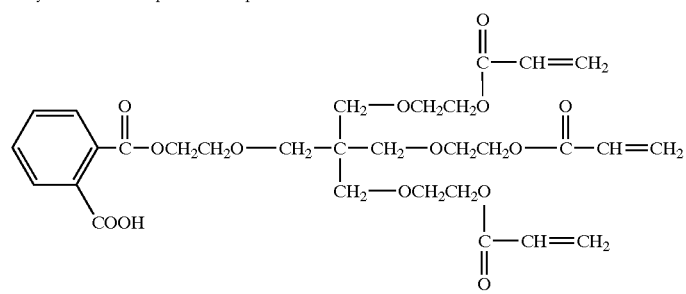

Polymerizable compound Group A3-3

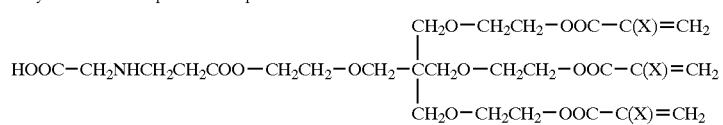

X:H or CH$_3$

Polymerizable compound Group A3-4

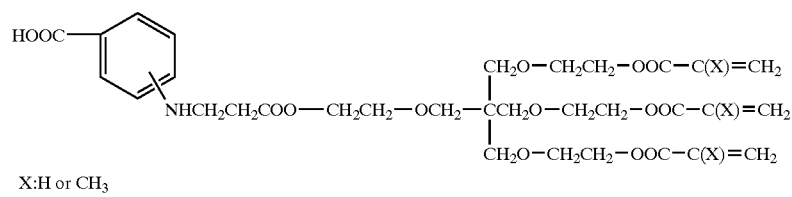

X:H or CH$_3$

Further, the compounds of the following Group A4 can be used. More particularly, the polymerizable compound A4-1 as represented below can be used.

Polymerizable material Group A4

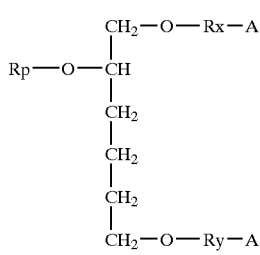

Polymerizable compound A4-1

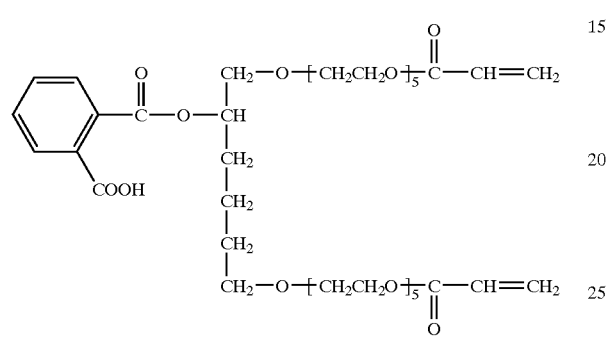

Polymerizable material Group A5

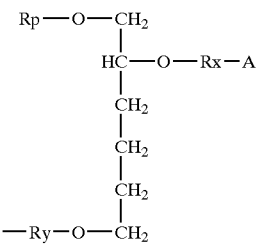

Polymerizable compound A5-1

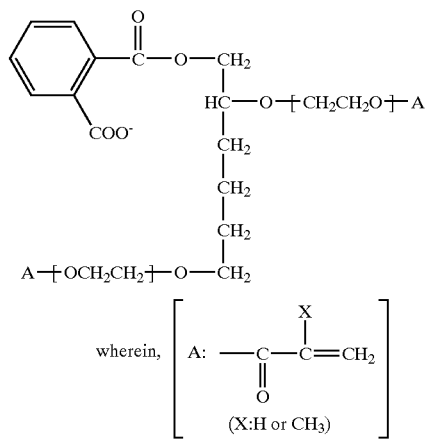

wherein, $\left[ A: \begin{array}{c} X \\ -C-C=CH_2 \\ \parallel \\ O \end{array} \right.$ (X:H or CH$_3$) $\Bigg]$ Further, the compounds of the following Group A5 can be used. More particularly, the polymerizable compound A5-1 as represented below can be used.

Further, the polymerizable compounds of the following Group A6 to A10 can be used.

Polymerizable material Group A6

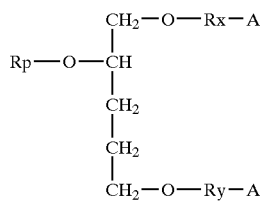

Polymerizable material Group A7

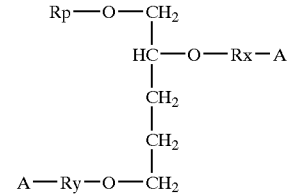

Polymerizable compound A8

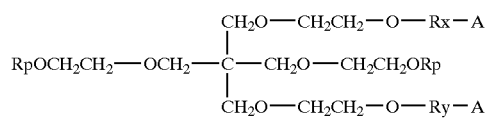

Polymerizable compound A8-1

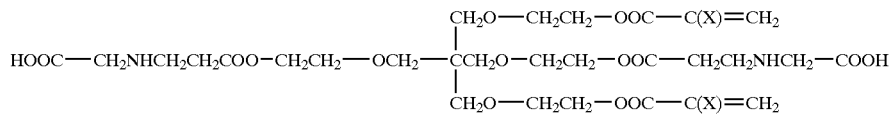

X:H or CH$_3$

-continued
Polymerizable compound A8-2
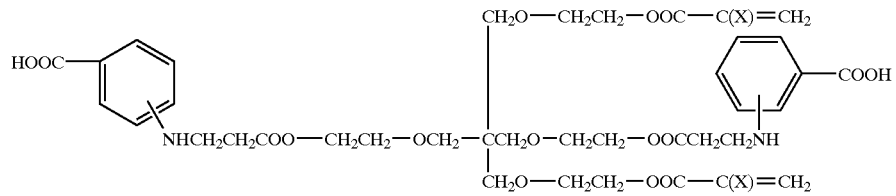
X: H or CH$_3$
Polymerizable compound A9
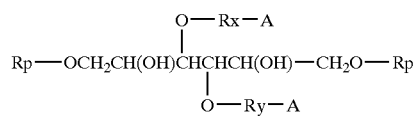
Polymerizable compound A9-1
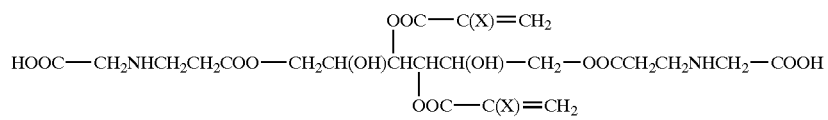
X: H or CH$_3$
Polymerizable compound A9-2
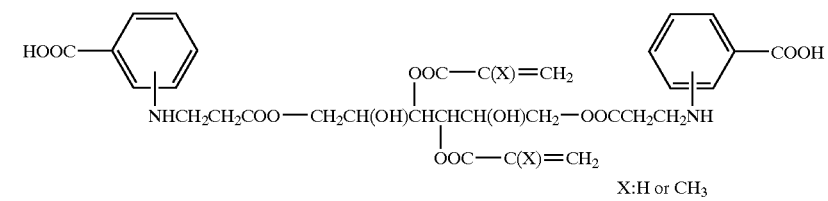
X: H or CH$_3$
Polymerizable compound A10
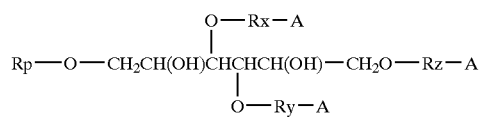
Polymerizable compound A10-1
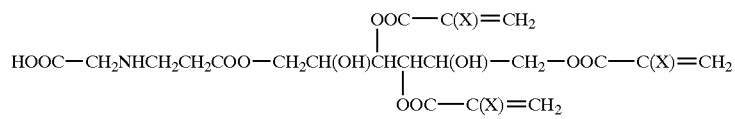
Polymerizable compound A10-2
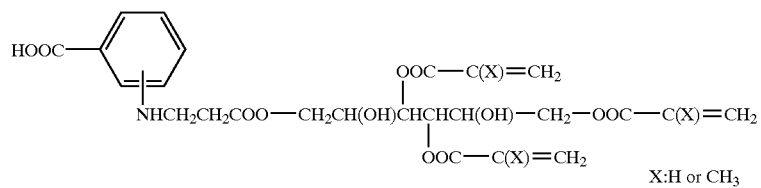
X: H or CH$_3$
Polymerizable compound A11
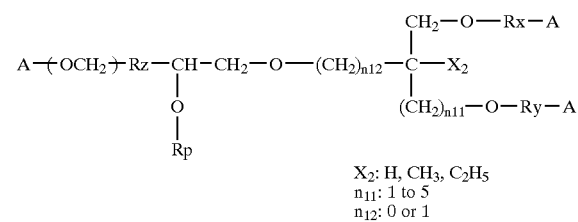
X$_2$: H, CH$_3$, C$_2$H$_5$
n$_{11}$: 1 to 5
n$_{12}$: 0 or 1

Polymerizable compound A11-1

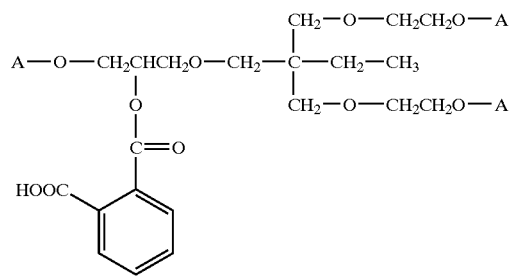

wherein,

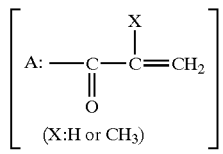

(X:H or CH₃)

Polymerizable compound A11-2

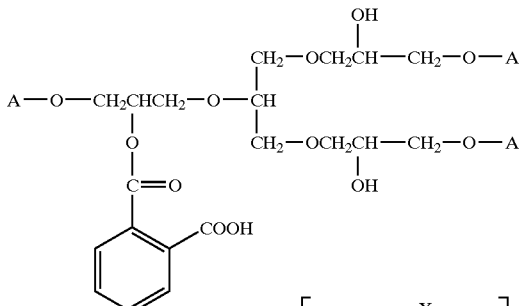

wherein,

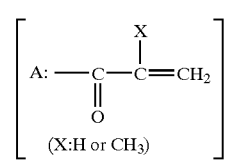

(X:H or CH₃)

Polymerizable compound A11-3

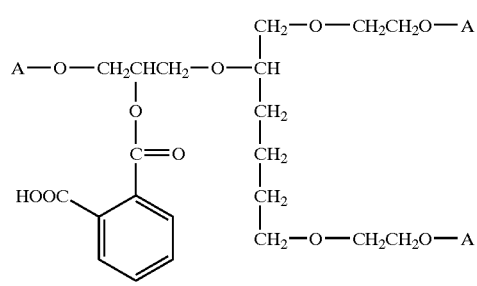

wherein,

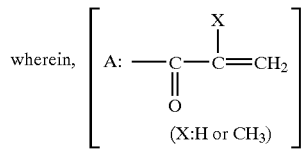

(X:H or CH₃)

The polymerizable compounds A10-1 and A10-2 can be prepared by coupling an amine having a carboxyl group, that is, by coupling an amine acid in a broad meaning to a vinyl group of an acrylic acid. Generally, it can be represented as below:

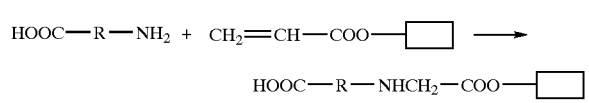

wherein, R represents methylene group in case of the compound A10-1, or phenylene group in case of the compound A10-2. Specific examples of the amine having a carboxyl group useful in this method include p-amine benzoic acid, glycine, valine, leucine, isoleucine, serine, threonine, methionine and phenylalanine.

Compounds of equivalent function can also be prepared by using an amino acid such as glutamic acid and aspartic acid, which has two carboxyl groups.

Polymerizable compounds of group B are represented by the following formulas B1 to B4. In the formulas B1 to B4, A and Rp represent the following atomic groups:

A:
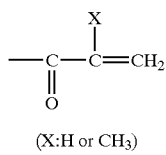
(X: H or CH₃)
Rp:
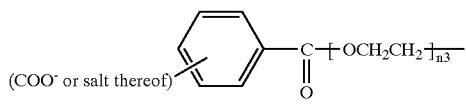
(n3 = 0 to 5)
or
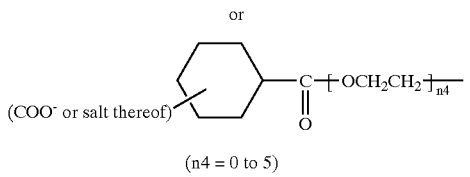
(n4 = 0 to 5)
Polymerizable material B1
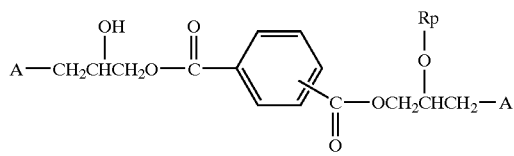
Polymerizable material B2
Polymerizable material B3
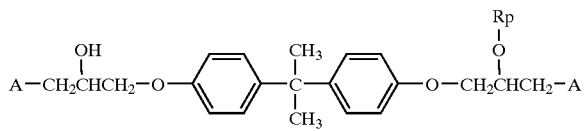
Polymerizable material B4
Polymerizable material B1-1
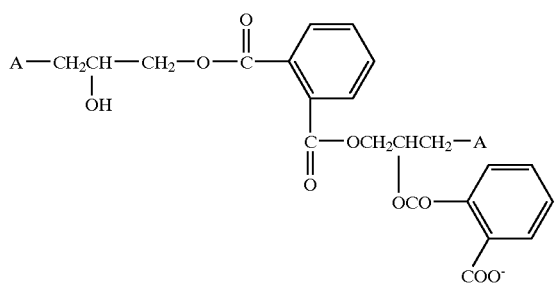
Polymerizable material B2-1
Polymerizable material B3-1
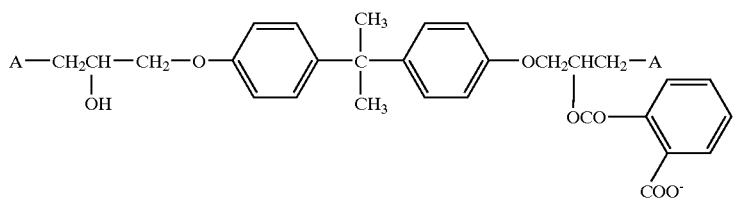
Polymerizable material B4-1
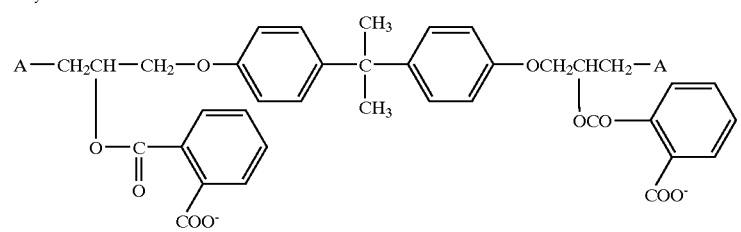
wherein, [ A: a group with X (H or CH₃) as shown ]

Among the aforementioned compounds of the various groups, particularly excellent compounds in view of the polymerization speed, hardness of the cured product, and water abrasion resistance, etc. are those having three polymerizable functional groups in a molecule. The main reason of this appears that when a compound having at least three functional groups polymerize, the density of cross linking is high and the hydrophilicity is greatly reduced as the polymerization proceeds.

Aqueous Photopolymerization Initiator Which Generates Radicals by UV Irradiation Next described is an aqueous photopolymerization initiator constituting the photocurable aqueous resin composition of the present invention. One example is a catalyst having a sensitivity at a wavelength of around 400 nm. Particularly preferred examples of such a catalyst are photopolymerization initiators represented by the following formulas (hereinafter referred to as Txs), which have a functionality in the long wave range, that is, a sensitivity to UV light to form a radical. They are properly selected according to the need of the present invention.

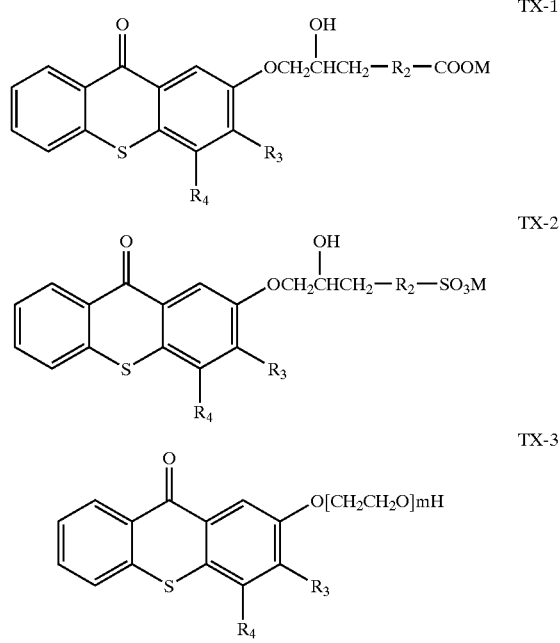

In the above formulas Tx-1 to Tx-3, R2 represents —(CH$_2$)x— (x=0 or 1), —O—(CH$_2$)y— (y=1 or 2), or a substituted or unsubstituted phenylene group. Further, when R2 is a phenylene group, at least one hydrogen atom of the benzene ring may be substituted with one or more groups or atoms selected from the group consisting of carboxyl group or a salt thereof, sulfonic acid or a salt thereof, straight or branched alkyl group having 1 to 4 carbon atoms, halogen atom (fluorine, chlorine, bromine, and iodine), alkoxy group having 1 to 4 carbon atoms, and aryloxy group such as phenoxy group. M represent a hydrogen atom or an alkaline metal (for instance, Li, Na, K, etc.). R3 and R4 independently represent a hydrogen atom or substituted or unsubstituted alkyl group such as straight or branched alkyl group having 1 to 10, preferably 1 to 3 carbon atoms, and which alkyl group can be substituted with halogen atom (fluorine atoms, chlorine atom), hydroxy group, or alkoxy group (of 1 to 3 carbon atoms), etc, and m represents an integer from 1 to 10.

Thioxanthones substituted with these hydrophilic atomic groups are compatible with a water-soluble or anionic aqueous pigment dispersion and are hardly affected by absorbance of the organic pigments themselves, they can be used as a highly sensitive catalyst in a pigment composition.

Further examples of a water-soluble photopolymerization initiator which constitutes the UV curable aqueous resin composition of the present invention include water-soluble derivatives of Irgacure 2959 (produced by Ciba Specialty Chemicals) (hereinafter, referred to ICs). More particularly, IC-1 and IC-2 of the following formulae can be used.

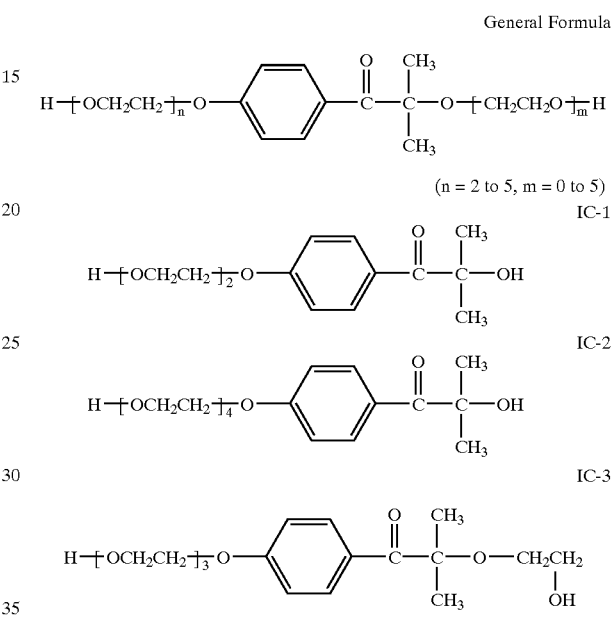

Although the above IC-1 and IC-2 are non-ionic, they are sensitive to UV light of a shorter wavelength range than the aforementioned photopolymerization initiators TX1 to TX3. Since IC-1 and IC-2 are also water-soluble as well as TX1 to TX3, they are useful as a component of the UV curable aqueous resin composition of the present invention. Alternatively, it may be possible to prepare an aqueous derivative from a known catalyst (photopolymerization initiator) for conventional UV polymerization system, to use as a photopolymerization initiator constituting the UV curable aqueous resin composition of the present invention.

Aqueous Pigment Dispersion

The UV curable aqueous resin composition of the present invention is not only useful as a main component of an ink, but also can be used as a colored UV curable ink or UV curable paint when combined with a pigment as colorant. In this case, it is preferable to mix an aqueous pigment dispersion prepared by dispersing a pigment in an aqueous medium with the UV curable aqueous resin composition of the present invention. It is more preferable to use an aqueous pigment dispersion wherein pigments are stably dispersed in water by the action of anionic functional groups. For example, it is possible to employ an aqueous gravure ink which is stable in a non-ionic or anionic system, or a pigment dispersion for water-based writing instruments, or a known pigment dispersion for ink-jet ink as they are.

Examples of the pigment dispersions dispersed by the use of an alkaline-soluble, water-soluble polymer having anionic dissociation groups are disclosed in Japanese Patent Application Laid-Open Nos. 5-247392 and 8-143802.

Further, Japanese Patent Application Laid-Open No. 8-209048 describes a pigment dispersion dispersed by a surfactant having an anionic dissociation group. Examples of pigment dispersions which are encapsulated by a polymer material and dispersed by an addition of anionic dissociation group to the surface are disclosed in Japanese Patent Application Laid-Open Nos. 10-140065, 9-316353, 9-151342, 9-104834, and 9-031360. Further, U.S. Pat. Nos. 5,837,045 and 5,851,280 disclose pigment dispersions wherein the pigment is dispersed by bonding anionic dissociation groups to the surface of the pigment by a chemical reaction. The all of the aforementioned pigment dispersions can be used as a colorant in the ink of the present invention.

When the UV curable aqueous resin composition of the present invention is used in an ink, it is not necessary to limit the colorant to pigments of the aforementioned, but it is possible to use a dye as a colorant to prepare an ink which contains an aqueous dye in a dissolved state, unless any practical problems of color fading due to the UV irradiation occur. Further, a dispersion of the coloring material which contains a dispersion dye, an oil-soluble dye, etc. in a dispersed state is also applicable, as well as the aforementioned pigment dispersion. They can be appropriately selected according to the intended use.

When a pigment is used as a coloring material, it is necessary to employ a pigment dispersion wherein the pigment is dispersed as fine particles in the medium. In order for a pigment dispersion to be appropriately used in an ink-jet recording ink, the following essential requirements must be satisfied: the pigment should be dispersed into an aqueous medium; the particle distribution of the dispersion as an average particle size should fall in the range of 25 nm to 350 nm; the viscosity of the finally obtained ink can be adjustable to a range not to affect the ink discharge; additionally, the pigment dispersion should also has a compatibility with the constitutional components of the UV curable resin composition of the present invention. Hereinafter, a preferred component of the pigment dispersion useful in the present invention is explained.

<Pigments>

As an organic pigment having a hue of a process color useful in a color ink, following examples are provided.

Special examples of a yellow pigment include: Pigment Yellow 1, 2, 3, 12, Pigment Yellow 13, Pigment Yellow 14, Pigment Yellow 16, Pigment Yellow 17, Pigment Yellow 55, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 109, Pigment Yellow 110, Pigment Yellow 114, Pigment Yellow 128, Pigment Yellow 138, Pigment Yellow 139, Pigment Yellow 150, Pigment Yellow 151, Pigment Yellow 154, Pigment Yellow 155, and Pigment Yellow 180, etc.

Special examples of a magenta pigment include: Pigment Red 5, Pigment Red 7, Pigment Red 12, Pigment Red 48 (Ca), Pigment Red 48 (Mn), Pigment Red 57:1, Pigment Red 57 (Sr), Pigment Red 57:2, Pigment Red 122, Pigment Red 123, Pigment Red 168, Pigment Red 184, Pigment Red 202, and Pigment Red 238, etc.

Specific examples of a cyan pigment include: Pigment Blue 1, Pigment Blue 2, Pigment Blue 3, Pigment Blue 16, Pigment Blue 22, Pigment Blue 60, Pigment Blue 15:2, Pigment Blue 15:3, Vat Blue 4 and Vat Blue 60, etc.

<Particle Size of Pigment in Ink>

The average diameter of pigment particles is in the range of 25 nm to 200 nm. While this range varies depending upon the use of the printed matter, sufficiently transparent printed matter can be obtained if the degree of scattering is low, because the above size is much smaller than the wavelength of the visible light.

<Coloring Dye>

With the ink containing the UV curable aqueous resin composition of the present invention, it is preferable to cure the UV curable resin (polymerizable material) contained in the corresponding ink by UV irradiation, after the ink is applied onto the recording material (paper, etc.). Unlike the case wherein pigment is used, a slight fading of color is unavoidable when a dye is employed as a coloring material. Thus, when dye is used as a coloring material for ink, a dye forming a complex with a metal ion, so-called metal complex azo dye, is preferably used because it experiences a little fading by irradiation. However, if the extent of fading does not matter, even an ordinary water-soluble dye may constitute an ink composition. With a proviso aforementioned, applicable dyes in view of having a color of process color are listed below:

Examples of a yellow dye include: Acid Yellow 11, Acid Yellow 17, Acid Yellow 23, Acid Yellow 25, Acid Yellow 29, Acid Yellow 42, Acid Yellow 49, Acid Yellow 61, Acid Yellow 71, Direct Yellow 12, Direct Yellow 24, Direct Yellow 26, Direct Yellow 44, Direct Yellow 86, Direct Yellow 87, Direct Yellow 98, Direct Yellow 100, Direct Yellow 130, Direct Yellow 132, and Direct Yellow 142, etc.

Examples of a magenta dye include: Acid Red 1, Acid Red 6, Acid Red 8, Acid Red 32, Acid Red 35, Acid Red 37, Acid Red 51, Acid Red 52, Acid Red 80, Acid Red 85, Acid Red 87, Acid Red 92, Acid Red 94, Acid Red 115, Acid Red 180, Acid Red 254, Acid Red 256, Acid Red 289, Acid Red 315, Acid Red 317, Direct Red 1, Direct Red 4, Direct Red 13, Direct Red 17, Direct Red 23, Direct Red 28, Direct Red 31, Direct Red 62, Direct Red 79, Direct Red 81, Direct Red 83, Direct Red 89, Direct Red 227, Direct Red 240, Direct Red 242, and Direct Red 243, etc.

Examples of a cyan dye include: Acid Blue 9, Acid Blue 22, Acid Blue 40, Acid Blue 59, Acid Blue 93, Acid Blue 102, Acid Blue 104, Acid Blue 113, Acid Blue 117, Acid Blue 120, Acid Blue 167, Acid Blue 229, Acid Blue 234, Acid Blue 254, Direct Blue 6, Direct Blue 22, Direct Blue 25, Direct Blue 71, Direct Blue 78, Direct Blue 86, Direct Blue 90, Direct Blue 106, and Direct Blue 199, etc.

The preferred concentration of a dye in an ink is in the range of 0.1 to 10% by weight. If the concentration is low, it can be appropriately used as a pale color ink of so-called image density modifying inks.

<Formulation for Clear Ink>

A clear aqueous ink preparation containing the UV curable aqueous resin composition of the present invention but not aforementioned coloring material can be used as a clear ink. Particularly, if it is formulated so as to have an ink-jet recording properties, an ink-jet recording clear ink of an aqueous UV curable type can be obtained. By using this type of ink, it is possible to obtain a clear coating film because it does not contain any coloring materials. Such a clear ink can be applied as an undercoat for providing adequate printing properties to a recording material, as an overcoat for the protection of surface of the image formed by a conventional ink, as well as for ornamental effect or for enhancing gloss. According to the use as mentioned above, clear ink may contain colorless pigment or fine particles not as a coloring matter. Such addition improves properties of the printed matter including image quality, fastness, handling property, etc. in either of the use as an undercoat or an overcoat.

As a formulation for the aforementioned clear ink, it is preferable to formulate such a clear ink to contain as the UV curable aqueous resin composition of the present invention 10 to 70% of the polymerizable material and 1 to 10 parts by weight of a photopolymerization initiator (UV light polymerization catalyst) based on 100 parts of the polymerizable material, with the proviso that the initiator is contained at least 0.5 parts based on 100 parts of the ink.

The exemplary prescriptions for the above clear ink are described in the following Table 1 with the use of polymerizable materials and photopolymerization initiator.

TABLE 1

Examples of Formulation for Clear Ink

| Materials | CInk 1 | CInk 2 | CInk 3 | CInk 4 | CInk 5 | CInk 6 | CInk 7 | CInk 8 | CInk 9 |
|---|---|---|---|---|---|---|---|---|---|
| Water | 60 | 61 | 54 | 47.5 | 35 | 27 | 73 | 47 | 39 |
| Polymerizable material [A1-1] | 38 | 33 | | | | | | | |
| Polymerizable material [A2-1] | | | 43 | | | | | | |
| Polymerizable material [A3-1] | | | | 45 | | | | | |
| Polymerizable material [B1-1] | | | | | 60 | | | | |
| Polymerizable material [B2-1] | | | | | | 70 | | | |
| Polymerizable material [B3-1] | | | | | | | 25 | | |
| Polymerizable material [B4-1] | | | | | | | | 50 | 45 |
| acryloyl morpholine | | 5 | | | | | | | 10 |
| Photopolymerization initiator [TX-1'] | 2 | | | | | 3 | | 3 | |
| Photopolymerization initiator [TX-2'] | | 3 | 3 | | | | 2 | | 4 |
| Photopolymerization initiator [IC-1] | | | | 2.5 | | | | | |
| Photopolymerization initiator [IC-2] | | | | | 5 | | | | |

In the above Table 1, the concrete structural formulae of TX-1' and TX-2' are as shown below.

In the following formulae, R2 represents —(CH$_2$)x— (x=0 or 1), —O—(CH$_2$)y— (y=1 or 2), or a substituted or unsubstituted phenylene group, M represents a hydrogen atom or an alkaline metal (Li, Na, etc.), R3 and R4 independently represent straight or branched alkyl groups having 1 to 3 carbon atoms.

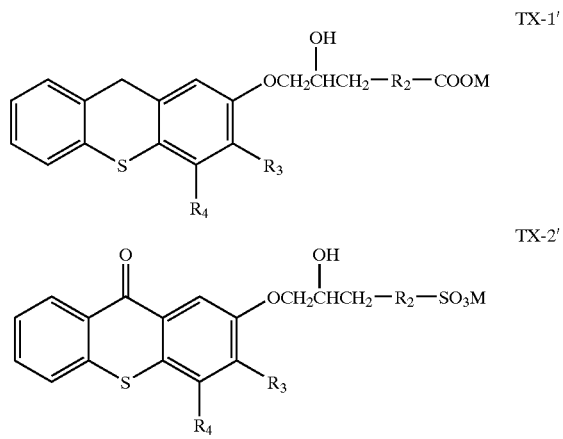

<Reactive Diluent Component>

As mentioned above, when the UV curable aqueous resin composition of the present invention is employed for a clear ink, an aqueous polymerizable monomer having low viscosity may be added as a solvent. An advantage of using such a material lies in that because such a material does not remain as a plasticizer in the solid after the curing by UV irradiation, its influence on the physical properties of the solid will be alleviated. Special examples of a reactive diluent component selected for the above purpose include acryloyl morpholine, N-vinylpyrrolidone, acrylamide, methylenebisacrylamide, monoacrylate of a monosaccharide, monoacrylic ester of an oligoethylene oxide, monoacrylic ester of a dibasic acid, etc.

<Solvent Component>

When the UV curable aqueous resin composition of the present invention is used for a clear ink, it is not recommendable to use a solvent which provides moisturizing effect conventionally used in the aqueous ink-jet ink, because with a clear ink not containing a solid component such as a pigment, viscosity hardly increases and even when viscosity increase occurs, it can be easily restored. As mentioned later, it is of course allowed to add more moisturizing solvent to a minimum extent. They can be selected from many compounds which have been widely used in the aqueous ink-jet field.

When the UV curable aqueous resin composition of the present invention is employed in an ink, a solvent component may be incorporated therein. Solvents are frequently used to provide the ink with non-volatility, viscosity reduction, wettability to the printing medium. In order to print on a non-absorbing material, it is preferred to add only water, not a solvent component into the ink to make all of the polymerizable materials harden and solidify.

In case when a solvent component is added to the ink to an extent of not less than 10%, a material on which images formed (recording substrate) should have a certain degree of absorbency in view of the strength of the finally ink film. For instance, with a gravure ink, a recording substrate having a certain wetting and permeability is used, and also a forced drying is conducted. Similarly, in an ink according to the present invention, when a solvent component is incorporated in an amount not less than 10%, it is preferable to provide a certain ink acceptance to the printing material by pretreatment, and to carry out a natural or forced drying process after the UV curing of the ink. Since the various polymerizable materials disclosed in the present invention have a certain degree of moisturizing effect (inhibition of evaporation of water, moisture maintenance), it is also possible to constitute an ink not to contain a solvent component at all. In this case, it is acceptable to take a measure such as capping, suction of a fresh ink at the start of printing, empty ejection, etc. for ensuring printing reliability.

The following is a list of a water-soluble organic solvent which relatively easily evaporate and dry, useful in the ink of the present invention. In the ink according to the present invention, a solvent selected from the following group of the organic solvents can be added. Special examples of such organic solvents include: glycolethers such as ethyleneglycol monomethylether, ethyleneglycol monoethylether, ethyleneglycol monoisopropylether, ethyleneglycol monoallylether, diethyleneglycol monomethylether, diethyleneglycol monoethylether, triethyleneglycol monomethylether, triethyleneglycol monoethylether, propyleneglycol monomethylether, dipropyleneglycol monomethylether, and monovalent alcohols.

<Material Constitution of Ink Containing Coloring Material>

When the UV curable aqueous resin composition of the present invention is used in an ink which contains a coloring material, it is desired to control the concentrations of the catalyst and the polymerizable material in the ink, according to the absorbing property of the coloring material. As aforementioned, the amount of water or solvent is in the range of 40 to 90% by weight, preferably 60 to 75% by weight. The content of the UV polymerizable compound is 1 to 30%, preferably 5 to 20% based on a total weight of the ink. The content of the polymerizable catalyst, although it varies depending on the content of the UV polymerizable compound, is generally in the range of 0.1 to 7%, preferably 0.3 to 5% based on a total weight of the ink.

When a pigment is used as a coloring material, the sheer concentration of the pigment in the ink is roughly 0.3 to 10% based on the total weight of the ink. Although the coloring strength of a pigment varies depending upon the dispersion state of the pigment particles, the range of about 0.3 to 1% will give a pale color ink. Concentrations higher than the above range are used for normal coloring. The concentration of a pigment dispersion also varies according to the viscosity and fluidity required by a printing apparatus. In case of an on-demand ink-jet apparatus, non-linear property is not found in a broad range of viscosity and 15 mM/m is the upper limit. In case ink dots are formed by a fine, high-density, high-driving frequency nozzle, the upper limit is 10 nM/m.

<Ink Preparation Process>

Because all of the above-mentioned polymerizable materials to be contained in the UV curable aqueous resin composition of the present invention have acidic functional groups, when such a compound is dissolved in water, it is preferably neutralized with a base to become a dissociated state. Accordingly, they are usually adjusted from neutral to basic by the use of alkaline metal, alcohol amine, morpholine, or piperidine, and then dissolved in water. In this case, it is recommended not to use the compounds having a primary or secondary amino group because addition to a double bond of the polymerizable materials may occur (Michael addition) even in an aqueous solution. Because this reaction is inhibited by a polar group, when water exist in a large amount, the reaction generally proceeds poorly. Thus, according to the warranty period, the necessity for avoiding the compounds having a primary or secondary amino group may vary.

The mixing order of the components of an ink is not critical, but in order to secure a stability during mixing, it is preferable to adjust the pH of the all of the components from neutral to basic in advance. During the mixing procedure, stirring is preferably carried out immediately so that the inhomogeneous state would not last long. When a pigment dispersion is used as a coloring material, it is recommendable to mix them without damaging the uniformity then further conduct stirring.

When the UV curable aqueous resin composition of the present invention contains a coloring material, especially for use as an ink-jet recording ink, the contents of the respective components are as follows. The pigment and the polymerizable material are used in the range of 0.3 to 10% and 5.0 to 30% respectively, based on the total weight of ink. The catalyst is used in the range of 1 to 10% based on the weight of the polymerizable material. The catalyst component is preferably contained in a concentration of at least 1% in the ink.

<Printer System>

As mentioned above, the ink of the present invention may contain an aqueous organic solvent as an optional component. In that case, such an organic solvent is preferably contained in an amount of 5 to 20% based on the total weight of the ink. Further, it is also possible to add a surface active agent for controlling wattability or penetrability of the ink, a preservative, or a stabilizer for inhibiting thermal dark reaction. In case that the polymerizable material which constitutes the UV curable aqueous resin composition being the main ink component already includes these additives, it is not necessary to add further, but otherwise, it may be necessary to add them according to the intended use.

A method and apparatus suitable for recording with the ink of the present invention includes such a method and apparatus that thermal energy is applied to the ink in the container of the recording head according to the recording signal, to form and eject an ink droplet.

Figure 4:
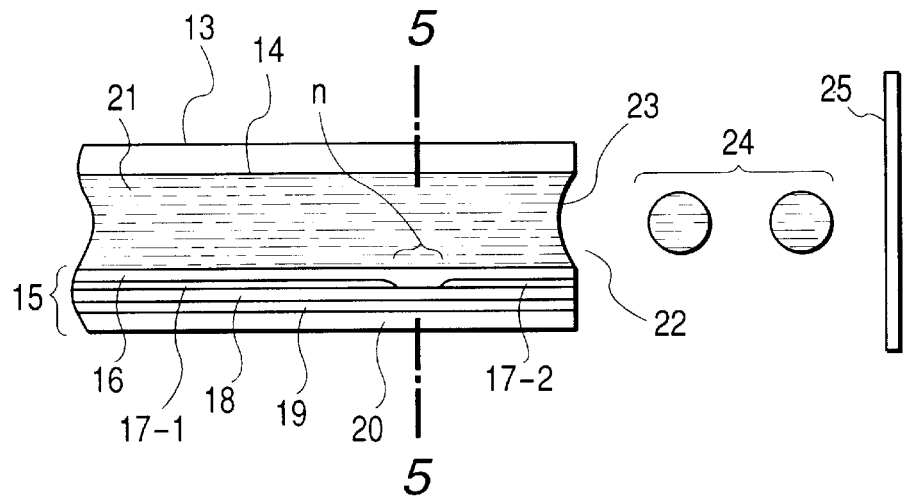
FIG. 4 shows an embodiment of a head of an ink-jet recording apparatus.
Figure 5:
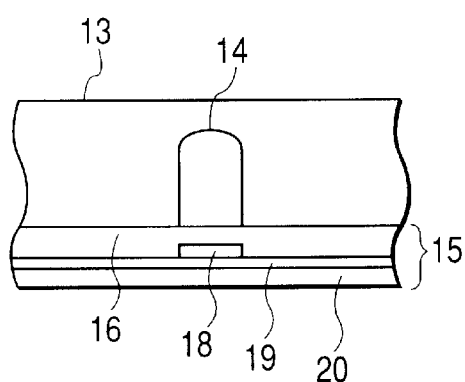
FIG. 5 is a cross-sectional view of FIG. 1 along the line 5—5.
Figure 6:
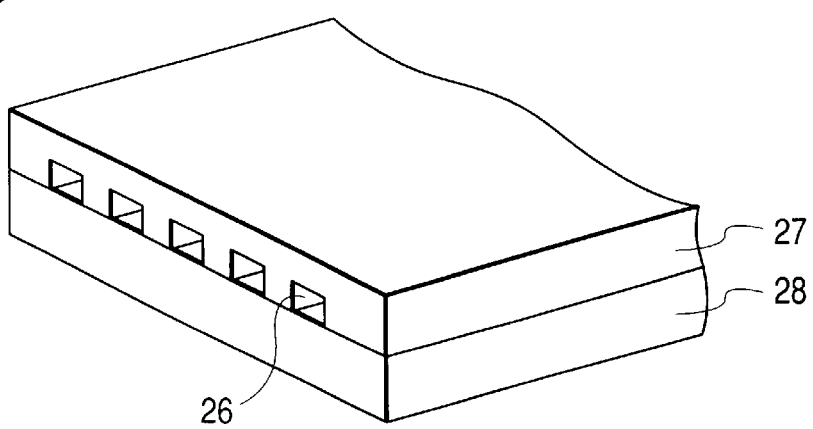
FIG. 6 schematically illustrates a multi-head.

Examples of the construction of a head which is a main component of the subject apparatus are first illustrated in FIGS. 4, 5 and 6. FIG. 4 is a cross-sectional view of a head 13 taken along the flow path of ink. FIG. 5 is a cross-sectional view taken along line 5—5 in FIG. 4. The head 13 is formed by bonding a glass, ceramic, or plastic plate or the like having a flow path 14 through which the ink passes to a heat-generating head 15 (while a thin layer head is illustrated in the figure, it is not intended to be restricted thereto). The heat-generating head 15 is composed of a protective layer 16 formed with silicon oxide, etc., an aluminum electrodes 17-1 and 17-2, the heat-generating resistor layer 18 made of nichrome, or the like, a heat accumulating layer 19, and a substrate 20 formed with alumina, etc. having good heat radiating properties.

Ink 21 passes to a discharge orifice (pore) 22 and forms a meniscus 23 by the pressure P. Upon application of electric pulse signals to the aluminum electrodes 17-1 and 17-2, the heat-generating head 16 rapidly generates heat in the region shown by n to form bubbles in the ink 21 which is in contact with the surface of this region. The meniscus 23 is projected by the action of pressure thus produced, and the ink 21 is discharged to flight out of the discharge orifice 22 toward a recording substrate 25 in the form of ink droplets 24.

FIG. 6 illustrates an appearance of a multi-head composed of an array of a plurality of heads as shown in FIG. 4. The multi-head is formed by bonding a glass plate 27 having a multiple nozzles 26 to a heat-generating head 28 which is similarly to the head as explained in FIG. 4. FIG. 4 is a cross-sectional view of a head 13 taken along the flow path of ink and FIG. 5 is a cross-sectional view taken along line 5—5 in FIG. 4.

Figure 7:
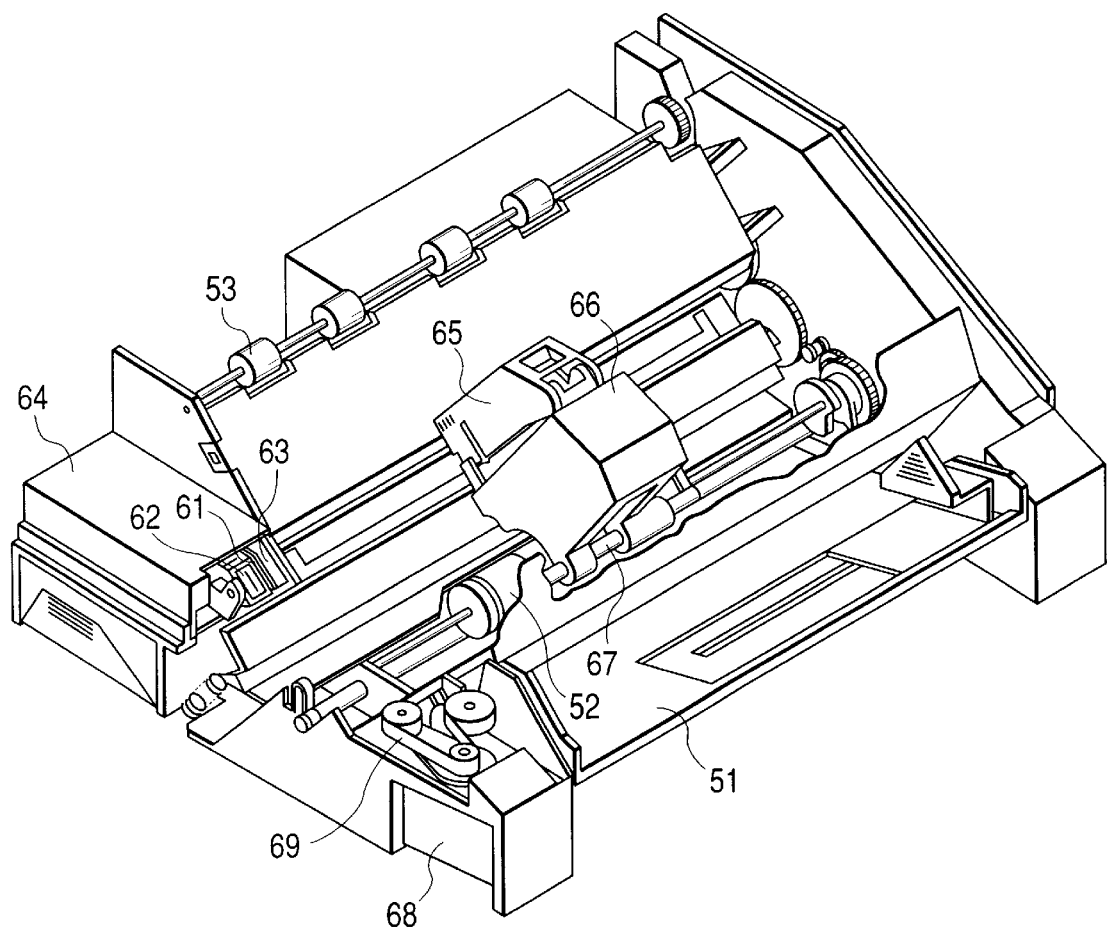
FIG. 7 is a schematic perspective view of an embodiment of an ink-jet recording apparatus.

FIG. 7 illustrates an example of an ink-jet recording apparatus into which such a head has been installed. A description for irradiating apparatus is provided separately below. In FIG. 7, reference numeral 61 designates a blade serving as a wiping member, one end of which is held and fixed by a blade-holding member to form a cantilever. The blade 61 is provided at a position adjacent to a region in which a recording head 65 operates, and in this embodiment, is held in such a way that it protrudes into the path through which the recording head 65 is moved. Reference numeral 62 indicates a cap for a discharge opening face of the recording head 65, which is provided at the home position adjacent to the blade 61, and is designed so that it moves in the direction perpendicular to the direction in which the recording head 65 is moved and comes into contact with the discharge opening face to cap them. Reference numeral 63 denotes an ink-absorbing member provided adjacent to the blade 61 and, similar to the blade 61, held in such a way that it protrudes into the path through which the recording head 65 is moved.

The above-described blade 61, cap 62 and ink-absorbing member 63 constitutes a discharge-recovery portion 64, where the blade 61 and ink-absorbing member 63 remove moisture, dust, frost or the like from the discharge opening face. Reference numeral 65 designates the recording head having a discharge-energy-generating means and serving to discharge the ink onto a recording medium positioned in an opposing relation to the discharge opening face having discharge openings to conduct recording. Reference numeral 66 indicates a carriage on which the recording head 65 is mounted so that the recording head 65 can be moved. The carriage 66 is slidably engaged with a guide shaft 67 and is connected (not illustrated) to a belt 69 driven by a motor 68. Thus, the carriage 66 can be moved along the guide shaft 67 and hence, the recording head 65 can be moved from a recording region to a region adjacent thereto.

Reference numeral 51 denotes a paper feeding portion into which the recording media are inserted and Reference numeral 52 indicates a paper feeding roller driven by a motor which is not illustrated. With such a construction, the recording medium is fed to the position opposite to the discharge opening face of the recording head 65, and discharged from a delivery section provided with delivery rollers 53 with the progress of recording.

In the above construction, while the cap 62 in the head recovery portion 64 is receded from the path of motion of the recording head 65 when the recording head 65 is returned to its home position after completion of recording, the blade 61 remains protruded into the path of motion. As a result, the discharge opening face of the recording head 65 is wiped. When the cap 62 comes into contact with the ejection opening face of the recording head 65 to cap it, the cap 62 is moved so as to protrude into the path of motion of the recording head.

When the recording head 65 moves from the home position to the position at which recording is started, the cap 62 and blade 61 are at the same positions in for the wiping described above. As a result, the discharge opening face of the recording head 65 is also wiped at the time of this movement. The above movement of the recording head 65 to its home position is made not only when the recording is completed or the recording head 65 is recovered for discharge, but also when the recording head 65 is moved between recording regions for the purpose of recording, during which it is moved to the home position adjacent to each recording region at given intervals, where the discharge opening face is wiped in accordance with this movement.

Figure 8:
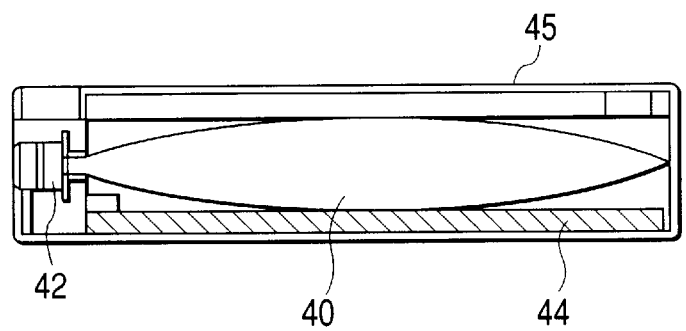
FIG. 8 is a cross-sectional view of an embodiment of an ink cartridge.

FIG. 8 illustrates an exemplary ink cartridge 45 in which an ink to be fed to a recording head through an ink-feeding member, for example, a tube, is contained. Here, reference numeral 40 designates an ink container portion containing the ink to be fed, as exemplified by a bag for the ink. One end thereof is provided with a cap 42 made of rubber. A needle (not illustrated) may be inserted into the cap 42 so that the ink in the bag 40 for the ink can be fed to the head. Reference numeral 44 indicates an ink-absorbing member for receiving a waste ink. It is preferred that the ink container portion be formed of a polyolefin, in particular, polyethylene, at the surface with which the ink comes into contact.

Figure 9:
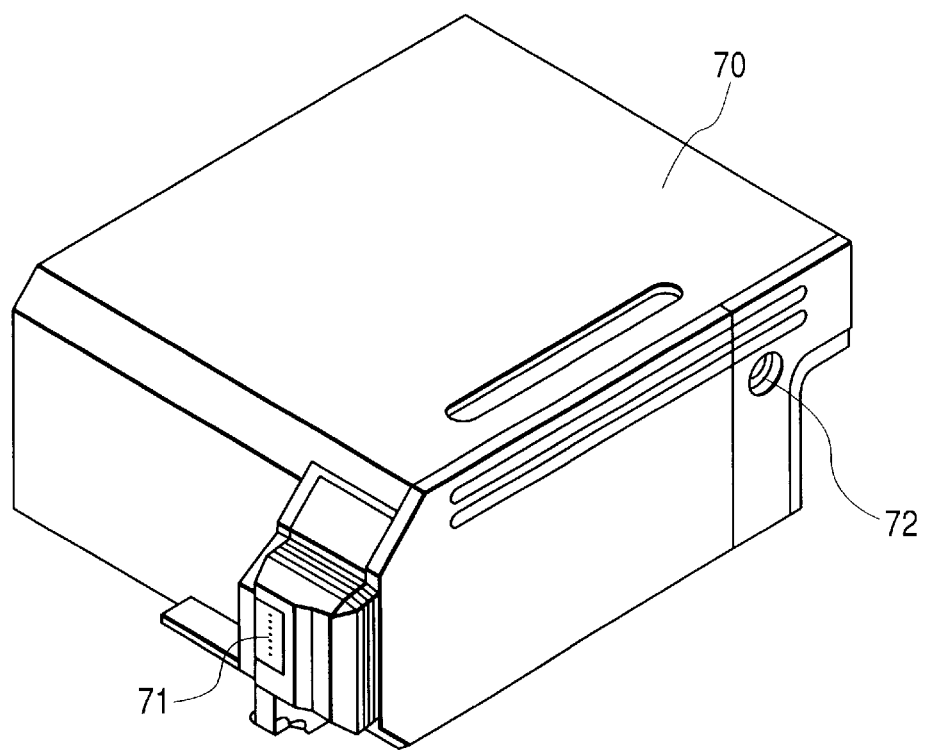
FIG. 9 is a perspective view of an embodiment a recording unit.

The ink-jet recording apparatus used in the present invention are not limited to the apparatus as described above in which the head and the ink cartridge are separately provided. Therefore, a device in which these members are integrally formed as shown in FIG. 9 can also be preferably used. In FIG. 9, reference numeral 70 designates a recording unit, in the interior of which an ink container portion containing an ink, for example, and an ink-absorbing member, is contained. The recording unit 70 is so constructed that the ink in such an ink-absorbing member is discharged in the form of ink droplets through a head portion 71 having a plurality of orifices.

Figure 2:
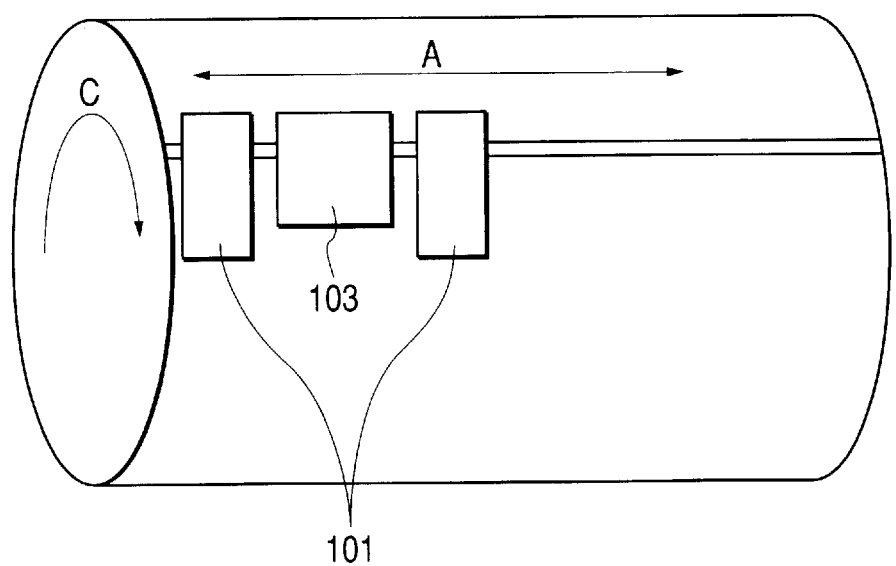
FIG. 2 shows another embodiment of the relatvie position of a recording head of an ink-jet printer and UV lamps of the UV irradiation device.
Figure 3A:
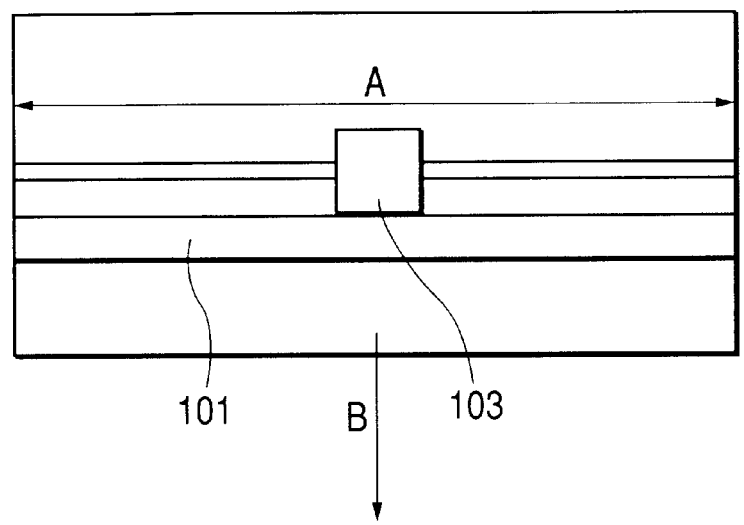
FIGS. 3A and 3B illustrate yet another embodiment of the relative position of a recording head of an ink-jet printer and a UV lamp of the UV irradiation device.
Figure 3B:
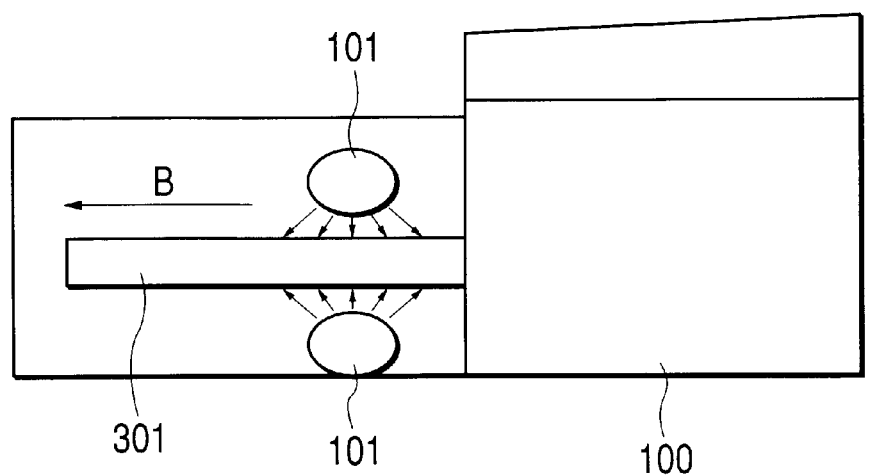

When a clear or colored ink containing the UV curable aqueous resin composition of the present invention as a main component is used in an ink-jet recording to form an undercoat or overcoat, or to form an image, the printing system is preferably the ink-jet printer provided with an UV irradiation apparatus on it. In this case, the UV irradiation apparatus is typically arranged in the position as exemplified in FIGS. 1 to 3A and 3B. FIG. 1 shows an embodiment wherein UV lamp 101 shuttles in the direction of arrow A in FIG. 1 along with the scanning of printer head (recording head) 103. The recording medium is conveyed in the direction of B in FIG. 1. FIG. 2 illustrates an embodiment wherein the recording medium (not illustrated) moves forward in a wound state on a rotary drum 201 which rotates in the direction of arrow C, while UV lamp 101 moves forward in such a way that the UV lamp irradiates the already printed region of the rotating recording medium. FIGS. 3A and 3B show an embodiment wherein UV lamp 101 having the same width as the recording medium is mounted for light exposure with a strong intensity in a slightly delayed timing than printing work. In that case, a portion of the recording medium (not illustrated) emerging from the print station is exposed to the light from top or bottom, or both (FIG. 3B). As illustrated in FIG. 3B, the best time interval from the printer head 103 to the irradiation area is such that irradiation is conducted before the ink completely penetrates into the recording medium 301 and while the ink components maintain their uniform state.

<UV Irradiation Lamp>

Preferred examples of an UV irradiation lamp include a so-called low-pressure mercury lamp, a high-pressure mercury lamp, a mercury lamp coated with fluorescent material, or the like which can maintain the steam pressure of the mercury in the range of 1 to 10 Pa while lighting-up. The light-emitting spectrum of these mercury lamp in UV range is 184 nm to 450 nm which is suitable for causing efficient reaction of the polymerizable materials in a black or colored ink. These lamps are also recommendable in the aspect that a small sized electric source can be used when mounting such an electric source to the printer. As a practical mercury lamp, it can be mentioned for example, a metal halide lamp, a high-pressure mercury lamp, an ultra high-pressure mercury lamp, a xenon flash lamp, a deep UV lamp, a lamp which is excited by a microwave from outside without electrodes, a UV laser, or the like. Further, because the light emitting wavelength includes the above-mentioned range, they are basically applicable as long as an electric source size, an input intensity, a shape of lamp and the like are acceptable. The light source is also selected in accordance with the sensitivity of the catalyst used.

With regard to the necessary UV integral intensity, the total amount of energy in the UV region is preferably in the range of 500 to 5,000 mJ/cm$^2$ in the aspect of the polymerization rate. An insufficient integrated irradiation amount would result in an insufficient adhesiveness to the ink recording medium, and in the case of color recording, it would also result in poor durability which in turn leads to a poor fastness of the printed ink, which is one of the object of the present invention.

By using the ink of the present invention, the polymerizable material in the ink is polymerized, cured and fixed by UV irradiation, which enables a glossy ink layer or image, a clear ink layer or image even when a pigment was used as a coloring material, good drying speed, excellent rub-off resistance of the image, ozone-resistance and water fastness of the image formed with dye, or the like. At the same time, because any deformation such as curl, cockle, etc. of the paper itself is suppressed, it is also advantageous in handling and storage of the papers.

dispersion of Pigment Blue 15:3, a dispersion of Pigment Black 7, Ink Set 1 having the composition as shown in Table 2 was prepared. In this set, the polymerization compound A3-1 which belongs to the polymerizable material group A3 and an aqueous photopolymerization initiator TX-2 were used for the UV curable aqueous resin composition. When preparing the respective inks which constitute Ink Set 1, the polymerizable material and an aqueous photopolymerization initiator (catalyst) were blended as aqueous solutions whose pH was in advance adjusted to pH 8.0 with triethanol, respectively. To this solution, all of the other components were added to adjust the pH of the ink to pH 8.5.

TABLE 2

Formulation of Ink Set 1

| Formulation | Y Ink 1 | M Ink 1 | BL Ink 1 | Bk Ink 1 |
|---|---|---|---|---|
| PY155 Dispersion | 24.8 (portion of pigment 4%) | | | |
| PR122 Dispersion | | 21.16 (portion of pigment 4%) | | |
| PB15:3 Dispersion | | | 24.69 (portion of pigment 4%) | |
| PBk 7 Dispersion | | | | 26.17 (portion of pigment 5%) |
| Polymerizable Compound A3-1 | 15 | 15 | 15 | 15 |
| Photoinitiation Initiator TX-2(1) | 1 | 1 | 1 | 1 |
| Water | 50.7 | 45.9 | 53.3 | 50.7 |
| Triethanol amine | An amount to adjust to pH 8.5 | | | |
| Viscosity (mN/m 25° C.) | 2.8 | 2.5 | 2.3 | 2.6 |

Pigment Dispersions used in the respective inks which constitute the above Ink Set 1

| Pigment Dispersion | Pigment Contained | Conc. of Pigment (%) | pH | Average Particle Size(nm) |
|---|---|---|---|---|
| PY155 Dispersion | Pigment Yellow 155 | 16.1 | 9.0 | 189 |
| PR122 Dispersion | Pigment Yellow 122 | 18.9 | 9.2 | 164 |
| RB15:3 Dispersion | Pigment Blue 15:3 | 16.2 | 9.0 | 106 |
| PBk 7 Dispersion | Pigment Black 7 | 19.1 | 9.6 | 113 |

Acrylic alkaline soluble aqueous polymer was used as a dispersing agent.

Printing Example 1

Ink Set 1 comprised of the inks of the aforementioned four colors were used to conduct the following printing test.
<Printer and UV Lamp>

By using a bubble-jet printer BJF-850 wherein three UV lamps were arranged at the paper discharging position, the following printing test was conducted. The center luminescent wavelength of lamp was 365 nm, the intensity at the position of irradiation was 12 mW/cm$^2$. The printed recording medium was irradiated with the UV lights for about 30 seconds.
<Recording Medium>

A glossy film HG-201 for an aqueous ink-jet and a glossy paper GP-301 (both are products of Canon) were used as a recording medium in printing a pattern formulated with the respective colors of YMCBk (yellow, magenta, cyan and black) and RGB (red, green, blue).

EXAMPLES

The present invention is described more specifically by Examples which by no means limit the present invention.

Example 1

<Ink Set 1 (Inks Containing a Pigment Dispersion Which Include a Polymeric Dispersing Agent)>

By using four kinds of dispersions, that is, a dispersion of Pigment Yellow 155, a dispersion of Pigment Red 122, a

Printing Comparative Example 1

A comparative print sample was prepared by using the same procedure of Printing Example 1 except that the following four kinds of inks were used.

Pigment Ink Y and Pigment Ink M in Printing Comparative Example 1 contained only the aforementioned pigment dispersions shown in Table 2 in a conventional solvent system which is not of an UV curable system. The formulation of such an ink comprises 4% of a pigment portion, 15% of a water-soluble organic solvent (concretely, 1,3-propanediol), and water. Further, as comparative dye Inks Y and M, the authentic ink products for BJF-850 were used. These inks comprise an ordinary solvent system not the UV curable system.

<Evaluation>

The Printing Example 1 and Comparative Printing Example 1 as prepared in the aforementioned were evaluated as explained below, on items of (1) glossiness, (2) adhesiveness, (3) light-fastness, (4) consecutive printing test wherein 50 sheets were consecutively printed using the same original. The evaluation on the above items (1), (2) and (3) were conducted with the print samples one day after the printing.

(1) Glossiness

With the respective samples, gloss value of 60 degree was measured with a variable degree glossmeter. The results are shown in Table 3. The glossiness of the images represented by these values may be assessed as below:

80: too glossy

60≦, and <80: glossiness of a silver salt photograph

40≦, and <60: glossiness of an offset printing on art paper

20≦, and <40: glossiness of a dry electrophotograph

20: glossiness of normal paper (2) Adhesiveness

With the respective print samples, adhesiveness was evaluated under the following two conditions, that is, under dry and moist conditions.

Dry condition: evaluated under the following criteria after rubbing 5 times the samples with a dry rubber eraser.

A: no change

B: rubbed mark is observed but no significant reduction of density

C: the ink layer is scraped and peeled off

Wet condition: evaluated under the following criteria after rubbing the samples one time with wet paper.

A: no change

B: moisturized but no ink blur observed

C: the ink layer of rubbed area was scraped and blots to other area (3) Light Fastness The respective print samples were irradiated for 100 hours with an Atlas Xenon Fade-Meter to obtain the color difference E and to evaluate as per the following standard.

A: E<5: excellent light fastness

B: 5≦E≦10: practically good light fastness

C: 10<E: of storage quality for a short-term use (4) Consecutive Printing Test

The quality of the images obtained from consecutive printing of 50 papers were compared visually and the images obtained at the end of printing were evaluated under the following standard:

A: No significant changes in the density and sharpness from those of the initially obtained images.

B: a slight lowering in the density and sharpness, but no practical problems.

C: lowering of density or dot disorder found

TABLE 3

Evaluation results of print samples obtained from the respective inks which constitute Ink Set 1

| Ink | | Glossiness | Adhesiveness Dry condition | Wet condition | Light fastness (ΔE) | Consecutive printing test |
|---|---|---|---|---|---|---|
| Inks related with the present invention | Y Ink 1 | 50 | A | A | 3.5 (A) | B |
| | M Ink 1 | 42 | A | A | 2.5 (A) | B |
| | BL Ink 1 | 45 | A | A | 4.3 (A) | B |
| | Bk Ink 1 | 30 | A | A | 1.5 (A) | B |
| Comparative Pigment Ink Y | | 25 | C | C | 3.2 (A) | B |
| Comparative Pigment Ink M | | 20 | C | C | 5.3 (A) | B |
| Comparative Dye Ink Y | | 60 | A | B | 45 (C) | A |
| Comparative Dye Ink M | | 55 | A | B | 60 (C) | A |

The following conclusion was obtained from the above Table 3. As seen from the results with the comparative pigment inks, the conventional pigment inks are better than dye inks in fastness and give images of excellent light fastness, but when compared to the comparative dye inks, they are worse in terms of adhesiveness and glossiness of images. On the other hand, the pigment inks containing the UV curable aqueous resin composition of the present invention are superior to the comparative pigment inks in that (1) glossiness of ink and adhesiveness are excellent, and (2) while being a pigment ink, they have excellent ink-jet ink properties because they are aqueous and contains multifunctional polymerizable compounds.

Clearness Evaluation Example 1 and Clearness Evaluation Comparative Example 1

Images were formed by using the same inks as shown in the above Table 2, and clearness of the pigment ink layers thereof were measured. In this measurement, F300D (a product of Fusion System Japan) was employed as an UV irradiation apparatus from which a high emission intensity can be obtained, in order to shorten the timing period from printing to curing. The lamp type was D bulb. The focus of the lamp was set on the surface of a conveyer on which the recording medium printed with the ink is conveyed. The light intensity at that surface position was measured and the results are shown in Table 4.

TABLE 4

Light intensity at the surface position of the focus of UV irradiation lamp

| F300D/R500 Wavelength range (nm) | | Total energy density (mJ/cm$^2$) (Conveyer speed: 3 m/min.) | Peak intensity (mW/cm$^2$) |
|---|---|---|---|
| 320~390 | UVA | 2374.80 | 4301.00 |
| 280~320 | UVB | 631.00 | 1237.80 |
| 250~260 | UVC | 44.89 | 89.26 |
| 395~445 | UVV | 2082.00 | 3748.80 |

The three kinds of inks, Y Ink 1, M Ink 1, and BL Ink 1 which constitute the Ink Set 1 having the composition of Table 2 (The constitutional inks of Ink Set 1: inks according to the present invention) were prepared. Three kinds of comparative pigment inks comprised of the respective pigment dispersions as used in the above and an ordinary solvent system not the UV curable system were prepared. By using a doctor blade of a gap of 18 m, these pigments inks were applied on a 7059 borosilicate glass plate of 1.1 mm thickness. Then immediately after such application, the glass plate was passed under the UV light having the intensity as shown in Table 4, at a speed of 4.0 m/min. After the UV curing, moisture was evaporated by drying at 80° C. for 10 minutes. The transmitting spectrum of the colored glass plate as prepared above was measured at a visible region by using the same glass plate without paining as a blank to determine the transmittance. The results are summarized in Table 5.

TABLE 5

Comparison of transmittance of the respective inks of Ink Set 1 and comparative pigment inks

| Wavelength (nm) | Constitutional inks of Ink Set 1 | | | Comparative pigment inks | | |
|---|---|---|---|---|---|---|
| | Y Ink 1 | M Ink 1 | BL Ink 1 | Y Ink | M Ink | BL Ink |
| 400 | 0.023 | 0.8520 | 0.4527 | 0.07727 | 0.7860 | 0.6568 |
| 450 | 0.3672 | 0.8635 | 0.8546 | 0.23326 | 0.7937 | 0.8784 |
| 500 | 0.9210 | 0.7473 | 0.9438 | 0.88338 | 0.6473 | 0.9135 |
| 550 | 0.9785 | 0.3045 | 0.5792 | 0.97049 | 0.4747 | 0.6105 |
| 600 | 0.9859 | 0.8724 | 0.1034 | 0.97000 | 0.8627 | 0.1496 |
| 650 | 0.9860 | 0.9557 | 0.1021 | 0.97100 | 0.9173 | 0.1515 |
| 700 | 0.9870 | 0.9724 | 0.1734 | 0.97700 | 0.9314 | 0.1446 |
| 750 | 0.9820 | 0.9755 | 0.4402 | 0.98008 | 0.9354 | 0.4407 |

Table 5 shows that because the pigment ink layers containing the UV curable aqueous resin composition of the present invention have a little scattering, they have a large difference between the transmittal range and absorbing range and high clarity. Further, the extent of scattering can be an indicator of the clarity of an ink which contains a binder.

Conversion ratio evaluation Example 1 By using a doctor blade of 18 μm gap, the inks constituting the Ink Set 1 as formulated in Table 2 were applied on a 7059 borosilicate glass plate having a thickness of 1.1 mm. Then immediately after such application, the glass plate was passed under the aforementioned UV conveyer at a respective speeds of 4.0 m/min, 8.0 m/min, 120 m/min, and 19 m/min. After the UV curing, moisture was evaporated by drying at 80° C. for 10 minutes. The conversion ratio of these samples were measured by a weight process. In the present invention, the conversion ratio is meant to indicate a value calculated by the following equation based on the measured value as obtained by the following steps. Table 6 shows the conversion rate of the respective inks as measured.

The conversion ratio is determined as follows.

1) The total weight of the substrate and the UV-cured film is measured.
2) The substrate is lightly agitated in water for 3 minutes to remove the unpolymerized components and then the total weight of the substrate and the film was measured.
3) The whole film is peeled off from the substrate to measure the weight of the substrate only. Conversion ratio=(Weight of the cured film components other than the polymerized solvent)/(Weight of the all of the film components other than solvent)×100

TABLE 6

Conversion ratio of the respective inks

| Conversion ratio (%) | Passing speed through under the UV conveyer | | | | No irradiation | Applied amount |
|---|---|---|---|---|---|---|
| | 4 m/min. | 8 m/min. | 12 m/min. | 19 m/min. | | |
| Y Ink 1 | 95 | 85 | 82 | 79 | 0 | 0.45 |
| M Ink 1 | 89 | 80 | 82 | 76 | 0 | 0.42 |
| BL Ink 1 | 94 | 83 | 76 | 79 | 0 | 0.47 |
| Bk Ink 1 | 87 | 85 | 80 | 72 | 0 | 0.43 |

Applied amount: represents the weight of total components other than solvent in case of no irradiation

[weight of film (mg/cm$^2$)]

Example 2

<Ink Set 2 (Inks Containing a Pigment Dispersion Which Does Not Include a Dispersing Agent)>

Ink Set 2 comprised of Y Ink 2, M Ink 2, BL Ink 2 and Bk Ink 2 whose composition is shown in Table 7 was prepared. In the respective inks which constitute Ink Set 2, the coloring material was a pigment dispersion prepared such that a pigment having an anionic dissociation group bonded to the surface by a chemical reaction was prepared by the method of U.S. Pat. No. 5,837,045 (Cabot Corporation), dispersed in an aqueous medium without using a dispersing agent, nor any dispersing process such as agitation/grinding/absorption. These inks contain the pigment, the counter ion of the pigment and water. The pigments used in this Example had been sulfonated. In these compositions, the polymerization compound A3-2 which belongs to the polymerizable material group A3 and an aqueous photopolymerization initiator TX-1 which constitute the UV curable aqueous resin composition were used. When preparing the respective inks which constitute Ink Set 2, the polymerizable material and an aqueous photopolymerization initiator (catalyst) were blended as aqueous solutions whose pH was in advance adjusted to pH 8.0 with triethanol, respectively. To this solution, all of the other components were added and then the pH of the ink was adjusted to pH 8.0. The printing tests and their estimation were performed in the same manner as in Example 1. The results are shown in Table 8.

coloring material was a pigment dispersion prepared such that a pigment whose surface is coated with resin to form a capsule was dispersed in an aqueous medium. These dispersion sets were provided from DAINIPPON INK AND CHEMICALS, INCORPORATED. The concentrates thereof include resin coated pigments, counter ion of resin and water. In these compositions, the polymerization com-

TABLE 7

Formulation of Ink Set 2

| Formulation | | Y Ink 2 | M Ink 2 | BL Ink 2 | Bk Ink 2 |
|---|---|---|---|---|---|
| Pigment Dispersion | IJX273B | 39.48 (portion of pigment 4%) | | | |
| | IJX266D | | 37.62 (portion of pigment 4%) | | |
| | IJX253C | | | 43.29 (portion of pigment 4%) | |
| | Cab-O-Jet 200 | | | | 25.0 (portion of pigment 5%) |
| Polymerizable Compound A3-2 | | 12 | 12 | 12 | 12 |
| Photoinitiation Initiator TX-1(1) | | 1 | 1 | 1 | 1 |
| Water | | 47.52 | 49.38 | 43.71 | 62.0 |
| Triethanol amine | | An amount to reach pH 8.0 | | | |
| Viscosity | | 2.8 | 2.5 | 2.3 | 2.6 |

Pigment Dispersions used in the respective inks which constitute the above Ink Set 2

| Pigment Dispersion | Pigment Contained | Conc. of Pigment (%) |
|---|---|---|
| Cab-O-jet 200 (Black) | Pigment Black 7 | 20 |
| IJX273B (Yellow) | Pigment Yellow 74 | 10.13 |
| IJX266D (Magenta) | Pigment Red 122 | 10.64 |
| IJX253C (Cyan) | Pigment Blue 15:3 | 9.24 |

TABLE 8

Evaluation results of print samples obtained from the respective inks which constitute Ink Set 2

| Ink | Glossiness | Adhesiveness Dry condition | Adhesiveness Wet condition | Light fastness (ΔE) | Consecutive printing test |
|---|---|---|---|---|---|
| Y Ink 2 | 23 | B | B | 6.8 (B) | A |
| M Ink 2 | 46 | B | B | 4.2 (A) | A |
| BL Ink 2 | 52 | B | B | 3.3 (A) | A |
| Bk Ink 2 | 26 | B | B | 2.9 (A) | A |

It is noted from the above results in comparison with Table 3 that although the adhesiveness of Ink Set 2 is inferior to that of Ink Set 1, result of the consecutive printing test is superior to that of Ink Set 1. The glossiness, light fastness, etc. of the images obtained are deemed to be equivalent to those of Ink Set 1.

Example 3

<Ink Set 3 (Inks Containing Encapsulated Pigment Dispersion)>

Ink Set 3 comprised of Y Ink 3, M Ink 3, BL Ink 3 and Bk Ink 3 whose composition is shown in Table 9 was prepared. In the respective inks which constitute Ink Set 3, the coloring material was a pigment dispersion prepared such pound A1-1 which belongs to the polymerizable material group A1 and an aqueous photopolymerization initiator IC-1 which constitute the UV curable aqueous resin composition were used. When preparing the respective inks which constitute Ink Set 3, the polymerizable material and an aqueous photopolymerization initiator (catalyst) were blended as aqueous solutions whose pH was in advance adjusted to pH 8.0 with triethanol, respectively. After all of the components were blended, the pH of the inks were finally adjusted to pH 8.0 with triethanol amine in case the pH of the obtained formulation is less than pH 8.0. The printing tests and their estimation were conducted in the same manner as in Example 1. The results are shown in Table 10.

TABLE 9

Formulation of Ink Set 3

| Formulation | | Y Ink 3 | M Ink 3 | BL Ink 3 | Bk Ink 3 |
|---|---|---|---|---|---|
| Pigment Dispersion | MCY | 27.97 (portion of pigment 4%) | | | |
| | MCM | | 28.77 (portion of pigment 4%) | | |
| | MCC | | | 27.97 (portion of pigment 4%) | |
| | MCBk | | | | 34.96 (portion of pigment 5%) |
| Polymerizable Compound A1-1 | | 15 | 15 | 15 | 15 |
| Catalyst IC-1 | | 1 | 1 | 1 | 1 |
| Water | | 56.03 | 55.23 | 56.03 | 49.04 |
| Triethanol amine | | An amount to reach pH 8.0 | | | |
| Viscosity (mN/m 25° C.) | | 3.1 | 3.5 | 3.3 | 3.7 |

Encapsulated Pigment Dispersions used in the above Ink Set 3

| Pigment Dispersion | Pigment Contained | Conc. of Pigment (%) |
|---|---|---|
| MCBk (Black) | Pigment Black 7 | 14.3 |
| MCY (Yellow) | Pigment Yellow 128 | 14.3 |
| MCM (Magenta) | Pigment Red 122 | 13.9 |
| MCC (Cyan) | Pigment Blue 15:3 | 14.3 |

By using the respective pigment dispersion of MCY, MCM and MCC as used in Ink Set 3 and an ordinary solvent system which is not an UV curable system, the comparative pigment inks Y, M, and C were prepared.

TABLE 10

Evaluation results of inks which constitute Ink Set 3

| Ink | Glossiness | Adhesiveness Dry condition | Adhesiveness Wet condition | Light fastness ($\Delta E$) | Consecutive printing test |
|---|---|---|---|---|---|
| Y Ink 3 | 36 | A | A | 8.5 (B) | A |
| M Ink 3 | 40 | A | A | 2.6 (A) | A |
| BL Ink 3 | 50 | A | A | 4.3 (A) | A |
| Bk Ink 3 | 27 | A | A | 3.7 (A) | A |
| Comparative pigment ink Y | 20 | A | A | 8.5 (B) | B |
| Comparative pigment ink M | 25 | A | A | 2.6 (A) | B |
| Comparative pigment ink C | 18 | A | A | 4.3 (A) | B |

It is noted from the above results that Ink Set 3 has excellent image quality, fastness and printing properties. Especially, it is interesting to find that the glossiness and image quality are remarkably improved compared to those of comparative dispersion inks which are not of the UV curing system. Improvement was also recognized in consecutive printing.

Example 4
<Ink Set 4 (Inks Containing Pigment Dispersion)>

Ink Set 4 comprised of Y Ink 4, M Ink 4, BL Ink 4 and Bk Ink 4 whose composition is shown in Table 11 was prepared. In the Ink Set 4, the pigment dispersion Nos. 1 to 4 were used as a coloring material wherein the pigments are physiochemically adsorbed and coated by a specific surfactant and dispersed in an aqueous medium. These dispersion sets were provided from FUJI SHIKISO, INCORPORATED.

They include pigments, surfactant, humectant, amine, preservatives and water. In these compositions, the polymerization compound A1-1 which belongs to the polymerizable material group A1 and an aqueous photopolymerization initiator IC-1 which constitute the UV curable aqueous resin composition were used. When preparing the respective inks which constitute Ink Set 4, the polymerizable material and an aqueous photopolymerization initiator (catalyst) were blended as aqueous solutions whose pH was in advance adjusted to pH 8.0 with triethanol, respectively. After all of the components were blended, the pH of the inks were finally adjusted to pH 8.0 with triethanol amine in case the pH of the obtained formulation is less than pH 8.0. The printing tests and their estimation were conducted in the same manner as in Example 1. The results are shown in Table 12.

Example 5
<Ink Set 5 (Inks Containing Pigment Dispersion)>

Ink Set 5 comprised of Y Ink 5, M Ink 5, BL Ink 5 and Bk Ink 5 whose composition is shown in Table 13 was prepared. In the Ink Set 5, respective inks contain as a coloring

TABLE 11

Formulation of Ink Set 4

| Pigment Dispersion | | Y Ink 4 | M Ink 4 | BL Ink 4 | Bk Ink 4 |
|---|---|---|---|---|---|
| Polymerizable Compound A1-1 | No. 1 | 33.33 (portion of pigment 4%) | | | |
| | No. 2 | | 28.57 (portion of pigment 4%) | | |
| | No. 3 | | | 22.22 (portion of pigment 4%) | |
| | No. 4 | | | | 33.33 (portion of pigment 5%) |
| Catalyst IC-1 | | 15 | 15 | 15 | 15 |
| Water | | 1 | 1 | 1 | 1 |
| Triethanol amine | | 56.67 | 55.43 | 61.78 | 50.67 |
| Viscosity (mN/m 25° C.) | | | An amount to reach pH 8.0 | | |
| | | 3.1 | 3.5 | 3.3 | 3.7 |

Encapsulated Pigment Dispersions used in the above Ink Set 4

| Pigment Dispersion | Pigment Contained | Conc. of Pigment (%) |
|---|---|---|
| No. 1 (Black) | Pigment Black 7 | 15.0 |
| No. 2 (Yellow) | Pigment Yellow 74 | 12.0 |
| No. 3 (Magenta) | Pigment Red 122 | 14.0 |
| No. 4 (Cyan) | Pigment Blue 15:3 | 18.0 |

By using the respective pigment dispersion of pigment Nos. 1 to 3 as used in Ink Set 4 and an ordinary solvent system which is not an UV curable system, the comparative pigment inks Y, M, and C were prepared.

material a pigment dispersion. The pigment dispersion was prepared such that a pigment was dispersed by using an alkaline soluble aqueous polymer as a dispersing agent. These pigment dispersions were produced by DAIN-

TABLE 12

| | | Evaluation results of inks which constitute Ink Set 4 | | | |
|---|---|---|---|---|---|
| | | Adhesiveness | | Light fastness | Consecutive |
| Ink | Glossiness | Dry condition | Wet condition | (ΔE) | printing test |
| Y Ink 4 | 36 | A | A | 8.5 (B) | A |
| M Ink 4 | 40 | A | A | 2.6 (A) | A |
| BL Ink 4 | 50 | A | A | 4.3 (A) | A |
| Bk Ink 4 | 27 | A | A | 3.7 (A) | A |
| Comparative pigment ink Y | 20 | A | A | 8.5 (B) | B |
| Comparative pigment ink M | 25 | A | A | 2.6 (A) | B |
| Comparative pigment ink C | 18 | A | A | 4.3 (A) | B |

It is noted from the above results that the inks constituting Ink Set 4 have excellent image quality, fastness and printing properties. Especially, it is interesting to find that the glossiness and image quality are remarkably improved compared to those of comparative dispersion ink which is not of the UV curing system. Further, an improvement is also acknowledged in the consecutive printing test property.

ICHISEIKA COLOR & CHEMICALS MFG. CO., LTD as a prototype of an ink jet ink. Their pigment dispersions are characterized by small particle size and narrow distribution. As the UV curable aqueous resin composition, the polymerizable compound A3-1 which belongs to the polymerizable material group A3 and an aqueous photopolymerization initiator TX-2(1) were used. When preparing the respective inks which constitute Ink Set 5, the polymerizable material and an aqueous photopolymerization initiator (catalyst)

were blended as aqueous solutions whose pH was in advance adjusted to pH 8.0 with triethanol, respectively. After all of the components were blended, the pH of the inks were finally adjusted to pH 8.5 with triethanol amine. The printing tests and their estimation were conducted as in the same manner as in Example 1. The results are shown in Table 14.

TABLE 13

Formulation of Ink Set 5

| Formulation | | Y Ink 5 | M Ink 5 | BL Ink 5 | Bk Ink 5 |
|---|---|---|---|---|---|
| Pigment Dispersion | PY 138 | 41.23 (portion of pigment 4%) | | | |
| | PR 122 | | 41.23 (portion of pigment 4%) | | |
| | PB 15:3 | | | 42.10 (portion of pigment 4%) | |
| | PBk 7 | | | | 49.50 (portion of pigment 5%) |
| Polymerizable Compound A3-1 | | 15 | 15 | 15 | 15 |
| Catalyst TX-2(1) | | 1 | 1 | 1 | 1 |
| Water | | 42.77 | 42.77 | 41.9 | 34.5 |
| Triethanol amine | | An amount to reach pH 8.5 | | | |
| Viscosity (mN/m 25° C.) | | 2.3 | 2.2 | 2.4 | 2.0 |

| | Encapsulated Pigment Dispersions used in the above Ink set 5 | | | |
|---|---|---|---|---|
| Pigment Dispersion | Pigment Contained | Conc. of Pigment (%) | pH | Average Particle Diameter (nm) |
| PY 138 | Pigment Yellow 138 | 9.7 | 7.76 | 109/33 |
| PR 122 | Pigment Red 122 | 9.7 | 8.02 | 116/38 |
| PB 15:3 | Pigment Blue 15:3 | 9.5 | 8.02 | 120/39 |
| PBk 7 | Pigment Black 7 | 10.1 | 7.21 | 98/33 |

As a dispersing agent, an alkaline soluble aqueous polymer was used.

TABLE 14

Evaluation results of inks which constitute Ink Set 5

| Ink | Glossiness | Adhesiveness | | Light fastness ($\Delta E$) | Consecutive printing test |
|---|---|---|---|---|---|
| | | Dry condition | Wet condition | | |
| Y Ink 5 | 65 | A | A | 8.5 (B) | A |
| M Ink 5 | 53 | A | A | 2.6 (A) | A |
| BL Ink 5 | 56 | A | A | 4.3 (A) | A |
| Bk Ink 5 | 40 | A | A | 3.7 (A) | A |

It is noted from the above results of Table 14 that the inks constituting Ink Set 5 have especially excellent glossiness. Two reasons may be considered for such remarkable glossiness compared to other examples: the binder function of the UV curing system, and the excellent fine particle level of the pigment dispersion, that is, the average particle size of the dispersion is small and its particle size distribution is narrow.

<Drying Speed Test and Printing Test With Normal Copying Paper>

Comparative Ink Set 5

By using the same pigment dispersions used in Ink Set 5, a Comparative Ink Set 5 comprised of the inks having the compositions as shown in Table 15 was prepared.

TABLE 15

Formulation of Comparative Ink Set

| Formulation | | Y Comparative Ink 5 | M comparative Ink 5 | BL comparative Ink 5 | Bk comparative Ink 5 |
|---|---|---|---|---|---|
| Pigment Dispersion | PY 138 | 41.23 (portion of pigment 4%) | | | |
| | PR 122 | | 41.23 (portion of pigment 4%) | | |
| | PB 15:3 | | | 42.10 (portion of pigment 4%) | |
| | PBk 7 | | | | 49.50 (portion of pigment 5%) |
| 1,3-propanediol | | 15 | 15 | 15 | 15 |
| Catalyst TX-2(1) | | 1 | 1 | 1 | 1 |
| Water | | 41.77 | 41.77 | 40.9 | 33.5 |
| Triethanol amine | | | An amount to reach pH 8.5 | | |

The practical drying speed was tested with the pigment inks of Ink Set 5 and Comparative Ink Set 5. As a recording medium, Xerox 4024 paper, a copying paper for electrophotography, was used. A solid monocolor pattern of 20 cm×20 cm was printed with each ink. Printing was conducted at a speed of 5 sheets/min. The apparatus as illustrated in FIGS. 3A and 3B was employed where the lamps were positioned in front of the printer. The obtained printed matter was tested for the following five items: (1) blur of the image by rubbing, (2) offset when discharged papers were piled up during prinitng, (3) curl of the paper, (4) reflective density of the image, (5) backthrough of ink through the reverse side of paper. The following standards for estimation were applied. The test results were summarized in Table 16.

Evaluation Standard (1) Image Blur by Rubbing

A: clear

B: slight blur

C: blur is noted (2) Offset Phenomenon When the Discharged Sheets Were Piled Up

A: no stain to the backside

B: faint stain to the backside

C: notably stained to the backside (3) Curling of the Paper

When the printed paper was put on a smooth plane, the heights of the both ends of the paper from the plane were measured.

A: not more than 1 cm

B: more than 1 cm and less than 2 cm

C: 2 cm or more

Reflection Density of Image

The density of the images were compared between Ink set 5 and Comparative Ink Set 5, where UV irradiation was conducted for the former and not for the latter.

Backthrough of the Ink to the Back Side

The reflection density d of the reverse side of the paper was measured with the reflection densitometer. The following standard was used in the estimation.

A: d<0.3

B: $0.3 \leq d < 0.6$

C: $d \geq 0.6$

TABLE 16

Printing test with a normal copying paper

| | UV irradi-ation | Blurring of images by rubbing | Offset to the reverse side by piling up | Curl of Paper | Reflection density of images | Backthroug of Ink to the reverse side |
|---|---|---|---|---|---|---|
| Y Ink 5 | Yes | A | A | A | 1.40 | A |
| Y Comparative Ink 5 | No | C | B | B | 1.23 | B |
| M Ink 5 | Yes | A | A | A | 1.35 | A |
| M Comparative Ink 5 | No | B | B | B | 1.30 | A |
| BL Ink 5 | Yes | A | A | A | 1.37 | A |
| BL Comparative Ink 5 | No | B | B | B | 1.25 | A |

TABLE 16-continued

| | UV irradi-ation | Printing test with a normal copying paper | | | | |
| --- | --- | --- | --- | --- | --- | --- |
| | | Blurring of images by rubbing | Offset to the reverse side by piling up | Curl of Paper | Reflection density of images | Backthroug of Ink to the reverse side |
| BK Ink 5 | Yes | B | A | A | 1.30 | A |
| Bk Comparative Ink 5 | No | C | B | B | 130 | B |

Example 6

Inks containing various UV curable resin compositions were prepared as shown in the following Table 17. The resin compositions were formulated to contain polymerizable compounds A3-1*, A8-1*, and A9-1*, respectively.

TABLE 17

| Formulation | Conc. (%) | C Ink 61 | C Ink 62 | C Ink 63 | C Ink 64 | C Ink 65 |
| --- | --- | --- | --- | --- | --- | --- |
| Cyan pigment dispersion C2 | 10 | 30 | 30 | 30 | 30 | 30 |
| Polymerizable Compound A3-1 | 100 | 15 | | | 15 | |
| Polymerizable Compound A8-1 | 100 | | 15 | | | 15 |
| Polymerizable Compound A9-1 | 100 | | | 15 | | |
| Photoinitiator IC-3 | 100 | | | | | 2 |
| Photoinitiator TX-1(1) | 50 | 2 | | | | |
| Photoinitiator TX-2(1) | 50 | | 2 | | | |
| Photoinitiator TX-3(1) | 50 | | | 3 | 3 | |
| Triethanol amine | 100 | 0.3 | 0.3 | 0.3 | 0.3 | 0 |
| Water | 100 | 52.7 | 52.7 | 51.7 | 51.7 | 53 |
| Average particle diameter (nm) | | 105 | 104 | 106 | 105 | 105 |
| Viscosity (mN/m 25° C.) | | 3.3 | 3.0 | 3.2 | 3.4 | 2.8 |

Remark: Cyan pigment dispersion C2: Pigment Blue 15:3 and a polyester resin dispersant were used.

In Table 17, TX-1(1), TX-2(1), and TX-3(1) have the following respective formulae:

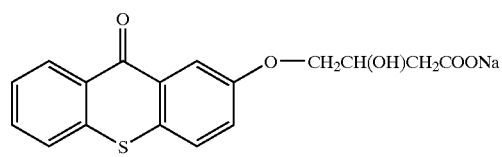

(TX-1(1))

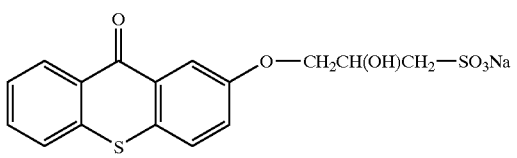

(TX-2(1))

(TX-3(1))

Preparation Method of the Above Pigment Dispersion C2:

An aqueous pigment dispersion of copper phthalocyanine was prepared by using as a dispersant a hydrophilic polyester resin having carboxylic acid value 130 and sulfonic acid value 50 (both of which values are obtained by a standard measurement using KOH). To 50 g of β-copper phthalocyanine pigment which had been treated to have an amino hydrophilic property, 150 ml of a 20% aqueous solution of the polyester resin was added and pre-mixed by using a homogenizer. Then, the obtained mixture was dispersed with a batch-type sand mill for 6 hours. After the treatment, the obtained dispersion was centrifuged to remove coarse particles, then pH was adjusted to obtain a pigment dispersion having 10.5% of solid content, pH of 8.2, surface tension of 47 mP.s, volume average particle diameter of 120±2.5 nm, and viscosity of 4.5 nM/m.

<Evaluation>

(1) Storage-stability Test 50 ml of the respective inks of Table 17 were put into two heat-resistant glass bottles. The glass bottles were stored for 3 months in dark or in an oven of 60° C. for one week. The result of the experiment was shown in Table 18.

TABLE 18

| Properties | Storage Condition | C Ink 61 | C Ink 62 | C Ink 63 | C Ink 64 | C Ink 65 |
|---|---|---|---|---|---|---|
| Average particle diameter (nm) | Room temperature | 125 ± 30 | 128 ± 22 | 120 ± 33 | 135 ± 24 | 126 ± 29 |
| Viscosity (mN/m 25° C.) | Room temperature | 3.1 | 3.3 | 2.8 | 3.0 | 3.5 |
| Average particle diameter (nm) | 60° C. | 128 ± 30 | 130 ± 26 | 135 ± 26 | 147 ± 33 | 127 ± 28 |
| Viscosity (mN/m 25° C.) | 60° C. | 3.2 | 3.5 | 3.4 | 3.8 | 3.2 |

It is noted from Table 18 that the storage stability under both storing conditions was good enough.

(2) Measurement of Photopolymerization Speed

By sing a high-pressure mercury lamp of 500 W input, the photopolymerization speed was measured in such a manner that the amount of gel portion corresponding to the irradiation energy was measured. The results are shown in Table 19.

The substrate for measurement was glass, the intensity of the UV light at the surface of the substrate was 20 mW/cm$^2$ at around 265 nm, 40 mW/cm$^2$ at around 365 nm.

TABLE 19

Photopolymerization speed

| Irradiation time (sec) | C Ink 61 | C Ink 62 | C Ink 63 | C Ink 64 | C Ink 65 |
|---|---|---|---|---|---|
| 5 | 7 | 3 | 5 | 10 | 2 |
| 10 | 20 | 15 | 20 | 20 | 8 |
| 15 | 37 | 25 | 42 | 34 | 25 |
| 20 | 59 | 60 | 61 | 67 | 48 |
| 25 | 85 | 78 | 88 | 85 | 70 |
| 30 | 90 | 85 | 95 | 96 | 97 |

<Advantage of the Invention>

The test result obtained from the aforementioned Ink Set 1 to 5 wherein the 5 types of different pigment dispersions were used as a coloring material show that:

(1) By adding the UV curable resin composition of the present invention, it is possible to prepare an ink having superior physiochemical properties stably.

(2) By applying the UV curable resin composition of the present invention as a component of an ink-jet ink, it is possible to obtain an excellent printing properties and the excellent image quality and fastness, regardless of the kind of the pigment dispersion used.

As aforementioned, the present invention provides an ink which is aqueous and still has a higher content of a polymerization material compared to the conventional ink, by containing the UV curable aqueous resin composition of the present invention. This enables a consecutive letter printing with an ink-jet apparatus as well as an excellent letter quality even in a consecutive printing with varying the concentration of pattern. Further, by using the photocurable aqueous resin composition of the present invention as a constitutional component of an ink, it is possible to achieve an image which has an improved adhesiveness and water-resistance even in the case wherein a pigment is used as a coloring material.

Moreover, by using the photocurable aqueous resin composition of the present invention as a constitutional component of a clear ink which does not include a coloring agent, it is possible to provide on a recording medium, a coating film whose wear-resistance is greatly improved so that it hardly experiences a change with rubbing by an eraser. The cured area with the addition of the clear ink has also a high contamination-resistance. Namely, when the surface of the cured membrane is stained with a various contaminants, such contaminant can be easily removed therefrom.

Besides, when such a clear ink is employed as an undercoat material, it is possible to obtain an image of a good chromatic properties in high concentration, even on a rough paper.

As reviewed from the aforementioned, by using the photocurable aqueous resin composition of the present invention as a constitutional ink, it is possible to improve the various printing properties of the printed matter to the extent of at least the equivalent level of those of the ordinary printed matter.

What is claimed is:

1. An aqueous photocurable resin composition comprising at least water, a polymerizable material which polymerizes with radical initiation and a water-soluble photopolymerization initiator which generates radicals with light, wherein the polymerizable material has at least two polymerizable functional groups and one or two anionic functional groups.

2. The aqueous photocurable resin composition according to claim 1, wherein the polymerizable material is a water-soluble polymerizable compound represented by the following formula in which R represents a polyol, or an epoxy ester polyol:

$$[Z\!\!+\!\!_L R\!\!+\!\!A]_k$$

k: 2 or 3  L: 1 or 3
Z: COO⁻ or a salt thereof $$\left[ A: \quad -\underset{\underset{O}{\|}}{C}-\underset{X}{C}=CH_2 \right]$$

(X:H or CH₃)

3. The aqueous photocurable resin composition according to claim 2, wherein the water-soluble photopolymerization initiator is a material having one anionic functional group.

4. The aqueous photocurable resin composition according to claim 2, wherein the polymerizable compound is selected from the group consisting of polymerizable materials of Groups A1 to A10 represented by the following formulae:

Polymerizable material Group A1

$$Rp-O-\underset{\underset{CH_2-O-Ry-A}{|}}{\overset{\overset{CH_2-O-Rx-A}{|}}{CH}}$$

Polymerizable material Group A2

$$Rp-O-CH_2-\underset{\underset{CH_2-O-Ry-A}{|}}{\overset{\overset{CH_2-O-Rx-A}{|}}{C}}-CH_2-CH_3$$

Polymerizable material Group A3

$$Rp-O-CH_2-\underset{\underset{CH_2-O-Ry-A}{|}}{\overset{\overset{CH_2-O-Rx-A}{|}}{C}}-CH_2-O-Rz-A$$

Polymerizable material Group A4

$$Rp-O-\overset{CH_2-O-Rx-A}{\underset{\underset{\underset{\underset{CH_2-O-Ry-A}{|}}{CH_2}}{CH_2}}{\overset{|}{CH}}}$$

Polymerizable material Group A5

$$Rp-O-CH_2$$
$$HC-O-Rx-A$$
$$CH_2$$
$$CH_2$$
$$CH_2$$
$$A-Ry-O-CH_2$$

Polymerizable material Group A6

$$Rp-O-\overset{CH_2-O-Rx-A}{\underset{\underset{\underset{CH_2-O-Ry-A}{|}}{CH_2}}{\overset{|}{CH}}}$$
$$CH_2$$

Polymerizable material Group A7

$$Rp-O-CH_2$$
$$HC-O-Rx-A$$
$$CH_2$$
$$CH_2$$
$$A-Ry-O-CH_2$$

Polymerizable material Group A8

$$RpOCH_2CH_2-OCH_2-\underset{\underset{CH_2O-CH_2CH_2-O-Ry-A}{|}}{\overset{\overset{CH_2O-CH_2CH_2-O-Rx-A}{|}}{C}}-CH_2O-CH_2CH_2ORp$$

Polymerizable material Group A9

$$Rp-OCH_2CH(OH)\overset{O-Rx-A}{\underset{\underset{O-Ry-A}{|}}{\overset{|}{CH}}CH}CH(OH)-CH_2O-Rp-COO-$$

Polymerizable material Group A10

$$Rp-O-CH_2CH(OH)\overset{O-Rx-A}{\underset{\underset{O-Ry-A}{|}}{\overset{|}{CH}}CH}CH(OH)-CH_2O-Rz-A$$

Polymerizable material Group A11

$$A+OCH_2+_{n12}Rz-CH-CH_2-O-(CH_2)_{n12}-\underset{\underset{(CH_2)_{n11}-O-Ry-A}{|}}{\overset{\overset{CH_2-O-Rx-A}{|}}{C}}-X_2$$
$$\underset{Rp}{\overset{|}{O}}$$

X₂: H, CH₃, C₂H₅
n₁₁: 1 to 5
n₁₂: 0 or 1 wherein R, A, X, Rx, Ry, Rz, and Rp represent the following atomic groups repectively:

$$A: \quad -\underset{\underset{O}{\|}}{C}-\underset{X}{\overset{|}{C}}=CH_2 \quad (X:H \text{ or } CH_3)$$

Rx,Ry,Rz:   $+CH_2CH_2O+_{n1}$   (side attached to A)   (n1 = 0 to 5) or $+CH_2CH_2O+_{n2}CH_2CHCH_2-O-$   (side attached to A)
$\quad\quad\quad\quad\quad\quad\quad\quad |$   (n2 = 0 to 5)
$\quad\quad\quad\quad\quad\quad\quad\quad OH$ Rp:

(COO⁻ or salt thereof)⟨benzene ring⟩$-\underset{\underset{O}{\|}}{C}+OCH_2CH_2+_{n3}$   (n3 = 0 to 5)

or

-continued

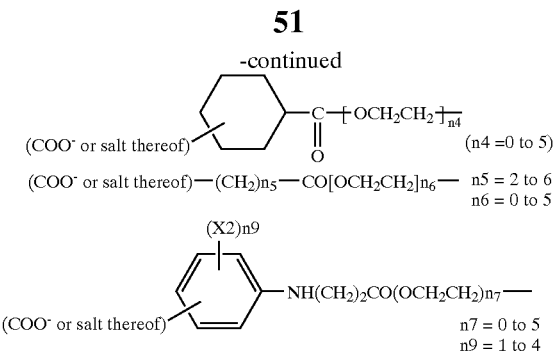

5. The aqueous photocurable resin composition according to claim 2, wherein the polymerizable compound is selected from the group consisting of the polymerizable materials of Groups B1 to B4 represented by the following formulae:

Polymerizable material B1

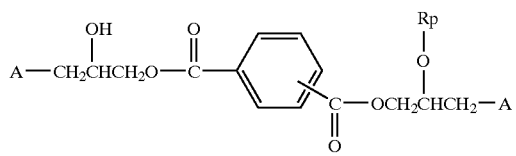

Polymerizable material B2

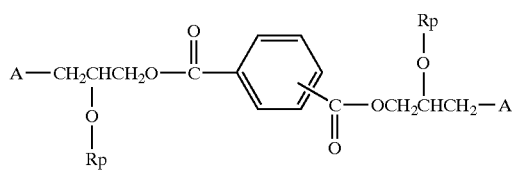

Polymerizable material B3

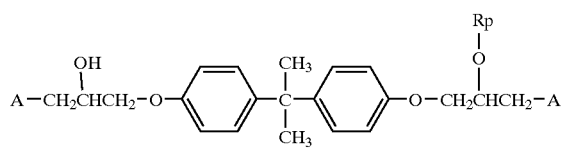

Polymerizable material B4

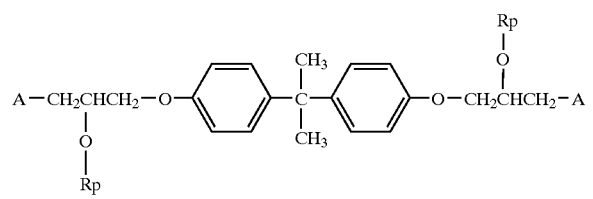

wherein A and Rp are the following atomic groups:

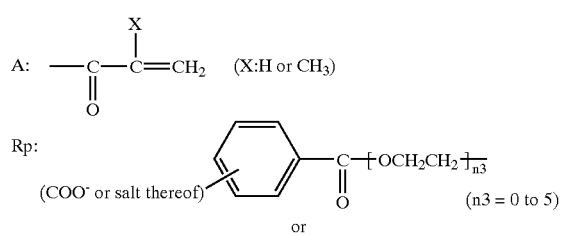

-continued

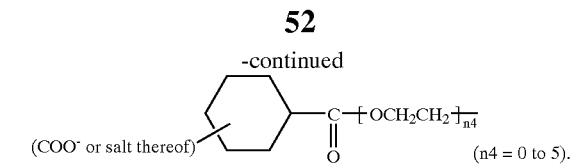

6. The aqueous photocurable resin composition according to claim 1, wherein the water-soluble polymerization initiator is selected from the group consisting of compounds represented by the following formulae:

TX-1

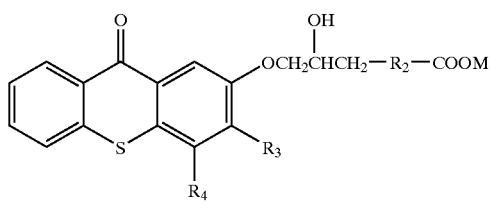

TX-2

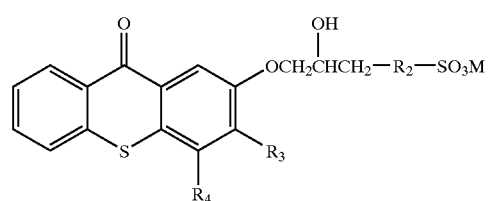

TX-3

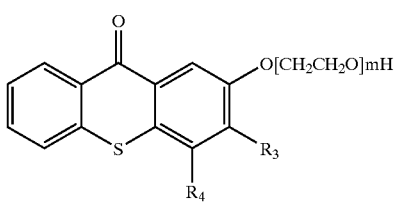

wherein, $R_2$ is a group selected from the group consisting of —$(CH_2)_x$— (x=0 or 1), —O—$(CH_2)_y$— (y=1 or 2), and substituted or unsubstituted phenylene, M is a hydrogen atom or an alkaline metal, $R_3$ and $R_4$ independently represent a hydrogen atom or a group selected from the group consisting of substituted or unsubstituted alkyls, and m is an integer from 1 to 10.

7. The aqueous photocurable resin composition according to claim 1, wherein the polymerizable compound has three polymerizable functional groups.

8. An aqueous ink comprising an aqueous photocurable resin composition according to claim 1 as a main component.

9. The aqueous ink according to claim 8, further comprising a coloring material which is dispersed in the aqueous ink with an anionic functional group.

10. The aqueous ink according to claim 8, which is an ink-jet recording ink.

11. An ink cartridge comprising an ink container containing an aqueous ink according to any one of claims 8 to 10.

12. A recording unit comprising an ink container containing an aqueous ink according to claim 10, and a recording head from which the ink is ejected.

13. An ink-jet recording apparatus comprising an ink container containing an aqueous ink according to claim 10, and a recording head from which the ink is ejected.

* * * * *

UNITED STATES PATENT AND TRADEMARK OFFICE
CERTIFICATE OF CORRECTION

| PATENT NO. | : 6,790,875 B2 |
|---|---|
| APPLICATION NO. | : 09/951460 |
| DATED | : September 14, 2004 |
| INVENTOR(S) | : Noguchi et al. |

It is certified that error appears in the above-identified patent and that said Letters Patent is hereby corrected as shown below:

ON THE TITLE PAGE:
At Item (57) Abstract:
Line 1, "An" should read --A--.

COLUMN 2:
Line 48, "UV-crable" should read --UV-curable--.
Line 62, "ink" should read --ink.--.

COLUMN 3:
Line 38, "this kind" should read --these kinds--.
Line 42, "not still" should read --still not--.

COLUMN 4:
Line 12, "compostion." should read --composition--.
Line 53, "R2" should read --$R_2$--.
Line 56, "R3 and R4" should read --$R_3$ and $R_4$--.
Line 65, "relatvie" should read --relative--.

COLUMN 5:
Line 6, "FIG. 1" should read --FIG. 4--.
Line 13, "embodiment" should read --embodiment of--.

COLUMN 6:
Line 16, "followings" should read --following--.

COLUMN 7:
Line 63, "(COO⁻ or salt thereof)—(CH$_2$)$_{n5}$ —CO[OCH$_2$CH$_2$]$_{n6}$ —" should read
--(COO⁻ or salt thereof)—(CH$_2$)$_{n5}$ —CO[OCH$_2$CH$_2$]$_{n6}$ — --.

Signed and Sealed this
Fourth Day of September, 2012

David J. Kappos
*Director of the United States Patent and Trademark Office*

CERTIFICATE OF CORRECTION (continued)
U.S. Pat. No. 6,790,875 B2

COLUMN 8:
Lines 1-6,

" 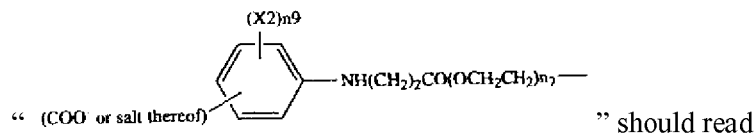 " should read

-- 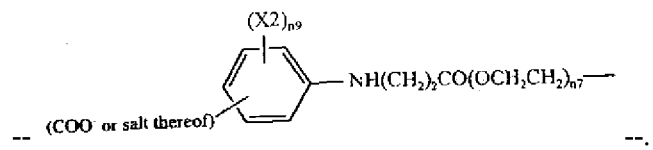 --.

Line 17, "(COO⁻ or salt thereof)—(CH$_2$)$_{n8}$NH(CH$_2$)$_2$CO(OCH$_2$CH$_2$)$_{n9}$—" should read --(COO⁻ or salt thereof)—(CH$_2$)$_{n8}$NH(CH$_2$)$_2$CO(OCH$_2$CH$_2$)$_{n9}$— --.

COLUMN 9:
Line 31, "Group A3-2" should read --A3-2--.
Line 44, "Group A3-3" should read --A3-3--.
Line 53, "Group A3-4" should read --A3-4--.

COLUMN 10:
Line 18, "Group A3-1" should read --A3-1--.

COLUMN 12:
Line 33, "A10" should read --A11--.

COLUMN 13:
Lines 42-47,

" 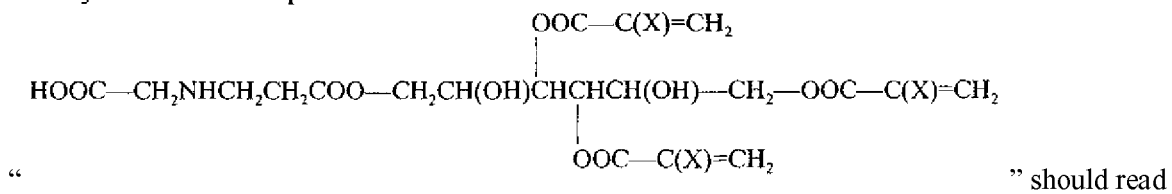 " should read

-- 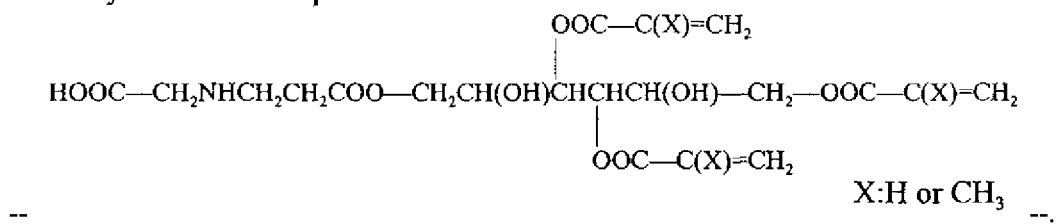 --.

COLUMN 17:
Lines 15-21,
"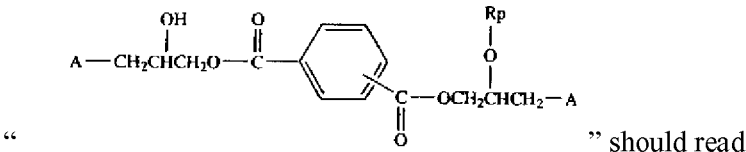" should read
--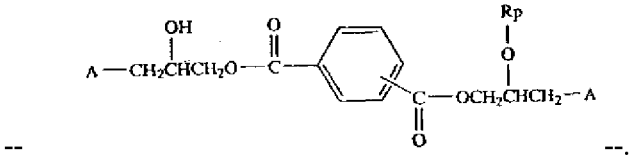--.
COLUMN 18:
Lines 15-21,
"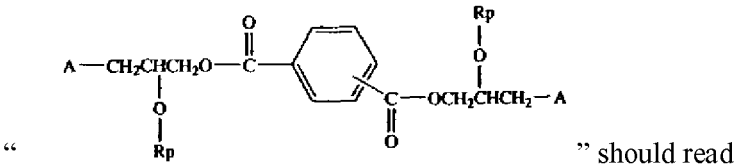" should read
--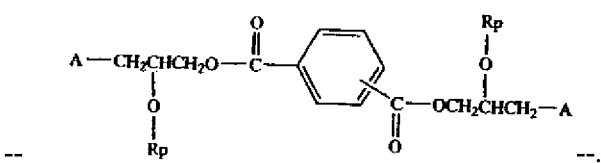--.
COLUMN 20:
Line 10, "to" should read --to as--.
COLUMN 21:
Line 35, "has" should read --have--.
Line 42, "ink," should read --ink, the--.
COLUMN 22:
Line 51, "an" should be deleted.
COLUMN 23:
Line 4, "contained" should read --contained at--.
COLUMN 24:
Line 52, "finally" should read --final--.

CERTIFICATE OF CORRECTION (continued)
U.S. Pat. No. 6,790,875 B2

COLUMN 25:
Line 57, "exist" should read --exists--.

COLUMN 28:
Line 55, "lamp" should read --lamps--.

COLUMN 29:
Line 11, "object" should read --objects--.

COLUMN 30:
Table 2, Line 43, "Pigment Yellow 122" should read --Pigment Red 122--.

COLUMN 31:
Line 54, "20:" should read --<20:--.

COLUMN 33:
Line 20, "18 m" should read --18 μm-- and "pigments" should read --pigment--.

COLUMN 34:
Line 4, "ratio evaluation" should read --Ratio Evaluation-- and "By" should read --¶By--.
Line 9, "a" should be deleted.
Line 10, "120 m/min," should read --12 m/min,--.

COLUMN 39:
Table 11 should read as follows.

TABLE 11

| Formulation of Ink Set 4 | | Y Ink 4 | M Ink 4 | Bl Ink 4 | Bk Ink 4 |
|---|---|---|---|---|---|
| Formulation | | | | | |
| Pigment Dispersion | No. 1 | 33.33 (portion of pigment 4%) | | | |
| | No. 2 | | 28.57 (portion of pigment 4%) | | |
| | No. 3 | | | 22.22 (portion of pigment 4%) | |
| | No. 4 | | | | 33.33 (portion of pigment 5%) |
| Polymerizable Compound A1-1 | | 15 | 15 | 15 | 15 |
| Catalyst IC-1 | | 1 | 1 | 1 | 1 |
| Water | | 56.67 | 55.43 | 61.78 | 50.67 |
| Triethanol amine | | An amount to reach pH 8.0 | | | |
| Viscosity (mN/m 25°C.) | | 3.1 | 3.5 | 3.3 | 3.7 |

COLUMN 43:
Table 15, Line 6, "comparative" (all three occurrences) should read --Comparative--.
Line 24, "recordin" should read --recording--.
Line 33, "prinitng," should read --printing,--.

COLUMN 44:
Line 51, "C:d ≤ 0.6" should read --C:d ≥ 0.6--.
Table 16, Line 52, "Backthroug" should read --Backthrough--.
Line 55, "irradi-ation" should read --irradiation--.

COLUMN 45:
Table 16, Line 6, "Backthroug" should read --Backthrough--.
Line 8, "irradi-ation" should read --irradiation--.
Line 11, "130" should read --1.30--.

COLUMN 47:
Line 41, "sing" should read --using--.

COLUMN 48:
Line 6, "an" should be deleted.
Line 49, "of a" should read --having--.

COLUMN 49:
Line 22, claim 4, "A10" should read --A11--.

COLUMN 50:
Line 50, claim 4, "repectively" should read --respectively--.

COLUMN 51:
Line 6, claim 4, "(COO⁻ or salt thereof)—(CH₂)n₅ —CO[OCH₂CH₂]n₆ — n5 = 2 to 6
                                                                n6 = 0 to 5" should read --(COO⁻ or salt thereof)—(CH₂)$_{n5}$ —CO[OCH₂CH₂]$_{n6}$ — n5 = 2 to 6
                                                            n6 = 0 to 5--.

Lines 8-16,

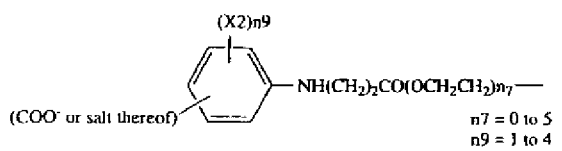

"

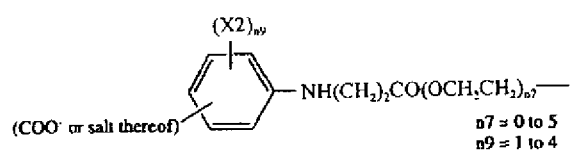

" should read

--  ... --.

CERTIFICATE OF CORRECTION (continued)
U.S. Pat. No. 6,790,875 B2

COLUMN 52:
Line 40, claim 6, "R2" should read --$R_2$--.
Line 41, claim 6, "(CH2)x" and "(CH2)y" should read --$(CH_2)x$-- and --$(CH_2)y$--.
Line 43, claim 6, "R3 and R4" should read --$R_3$ and $R_4$--.